(12) United States Patent
Sugimoto et al.

(10) Patent No.: US 12,367,552 B2
(45) Date of Patent: Jul. 22, 2025

(54) IMAGE PROCESSING APPARATUS, DISTANCE MEASURING APPARATUS, AND IMAGE PROCESSING METHOD

(71) Applicant: KABUSHIKI KAISHA TOSHIBA, Tokyo (JP)

(72) Inventors: Toshiki Sugimoto, Kawasaki Kanagawa (JP); Tuan Thanh Ta, Kawasaki Kanagawa (JP); Akihide Sai, Yokohama Kanagawa (JP); Hisaaki Katagiri, Kawasaki Kanagawa (JP); Yutaka Ota, Yokohama Kanagawa (JP); Satoshi Kondo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 502 days.

(21) Appl. No.: 17/930,599

(22) Filed: Sep. 8, 2022

(65) Prior Publication Data
US 2023/0281771 A1    Sep. 7, 2023

(30) Foreign Application Priority Data
Mar. 2, 2022    (JP) .................. 2022-032146

(51) Int. Cl.
*G06T 5/50* (2006.01)
*G01S 7/481* (2006.01)
(Continued)

(52) U.S. Cl.
CPC .............. *G06T 5/50* (2013.01); *G01S 7/4817* (2013.01); *G01S 7/4865* (2013.01);
(Continued)

(58) Field of Classification Search
CPC .. G06T 5/50; G06T 7/248; G06T 5/73; G06T 2207/10028; G06T 2207/20212;
(Continued)

(56) References Cited

U.S. PATENT DOCUMENTS

| | | | |
|---|---|---|---|
| 8,159,598 B2 * | 4/2012 | Watanabe | G06T 7/564 348/270 |
| 11,693,114 B2 * | 7/2023 | Kubota | G01S 17/42 356/3 |

(Continued)

FOREIGN PATENT DOCUMENTS

| | | | |
|---|---|---|---|
| JP | 2019-168417 A | 10/2019 | |
| JP | 2020-505678 A | 2/2020 | |

(Continued)

OTHER PUBLICATIONS

Japan Patent Office, Office Action in JP App. No. 2022-032146, 5 pages, and machine translation, 8 pages (Nov. 8, 2024).

(Continued)

*Primary Examiner* — Gregory M Desire
(74) *Attorney, Agent, or Firm* — Finnegan, Henderson, Farabow, Garrett & Dunner, LLP

(57) ABSTRACT

An image processing apparatus has a light source that emits a light signal at a predetermined time interval, a scanner capable of changing at least one of a scanning range or a scanning timing of the light signal for each of frames, a light receiver that receives a reflected light signal reflected on an object by irradiating the object with the light signal, processing circuitry that generates a distance image for each of the frames based on the reflected light signal received by the light receiver, and synthesizes the distance images of a plurality of the frames to generate a high-resolution distance image.

20 Claims, 35 Drawing Sheets

(51) Int. Cl.
  *G01S 7/4865*  (2020.01)
  *G01S 17/894*  (2020.01)
  *G06T 5/00*  (2024.01)
  *G06T 5/73*  (2024.01)
  *G06T 7/246*  (2017.01)
  *G06V 10/40*  (2022.01)
  *H04N 23/56*  (2023.01)

(52) U.S. Cl.
  CPC .............. *G01S 17/894* (2020.01); *G06T 5/73* (2024.01); *G06T 7/248* (2017.01); *G06V 10/40* (2022.01); *G06T 2207/10028* (2013.01); *G06T 2207/20212* (2013.01); *H04N 23/56* (2023.01)

(58) Field of Classification Search
  CPC .... G01S 17/894; G01S 7/4817; G01S 7/4865; G06V 10/40; H04N 23/56
  See application file for complete search history.

(56) References Cited

U.S. PATENT DOCUMENTS

| | | |
|---|---|---|
| 11,815,617 B2 | 11/2023 | Mahler et al. |
| 12,146,966 B2 * | 11/2024 | Kato ..................... G01S 17/894 |
| 2018/0284280 A1 | 10/2018 | Eichenholz et al. |
| 2019/0361099 A1 | 11/2019 | Satat et al. |
| 2021/0311191 A1 | 10/2021 | Nagashima |
| 2021/0356601 A1 | 11/2021 | Burbank et al. |
| 2022/0018937 A1 * | 1/2022 | Tezuka ..................... G01S 17/10 |
| 2022/0365221 A1 | 11/2022 | Dong et al. |

FOREIGN PATENT DOCUMENTS

| | | |
|---|---|---|
| WO | WO 2018/179649 A1 | 10/2018 |
| WO | WO 2020/110801 A1 | 6/2020 |
| WO | WO 2021/147527 A1 | 7/2021 |
| WO | WO 2021/234333 A1 | 11/2021 |

OTHER PUBLICATIONS

Japan Patent Office, Office Action in JP App. No. 2022-032146, 3 pages, with machine translation, 5 pages (Jan. 28, 2025).

Fang Wang et al., "Dual Deblurring Leveraged by Image Matching," 2013 IEEE Int'l Conf. on Image Processing, pp. 567-571, DOI: 10.1109/ICIP.2013.6738117 (2013).

* cited by examiner

IMAGE PROCESSING APPARATUS, DISTANCE MEASURING APPARATUS, AND IMAGE PROCESSING METHOD

CROSS REFERENCE TO RELATED APPLICATIONS

This application is based upon and claims the benefit of priority from the prior Japanese Patent Application No. 2022-032146, filed on Mar. 2, 2022, the entire contents of which are incorporated herein by reference.

FIELD

Embodiments described herein relates generally to an image processing apparatus, a distance measuring apparatus, and an image processing method.

BACKGROUND

In order to increase the accuracy of distance measurement by a light detection and ranging (LiDAR) device used for automatic driving or the like, it is desirable to decrease the beam diameter of a light signal. However, in order to decrease the beam diameter, it is necessary to increase the aperture of a lens or the number of lenses, the size of a housing of the LiDAR device is increased, and the component cost also increases.

By receiving the light signal with a pixel width smaller than the beam diameter and performing the distance measurement, it is possible to increase the resolution of a distance image. However, since the amount of received light for each pixel decreases, the S/N ratio decreases, and the accuracy of the distance measurement decreases.

Furthermore, when the distance measurement is performed in units of a plurality of pixels in accordance with the size of the beam diameter, the S/N ratio increases, but the effective resolution decreases.

BRIEF DESCRIPTION OF THE DRAWINGS

FIG. 43 is a diagram illustrating luminance information of the object;

FIG. 173 is a diagram schematically illustrating a distance image generated in step S2 illustrated in FIG. 16;

FIG. 23 is a block diagram illustrating a schematic configuration of an image processing apparatus according to a third embodiment;

FIG. 33 is a diagram illustrating an example in which the depression on the road is recognized as a feature object, a second frame is scanned with a light signal shifted by a ⅓ pixel from a first frame, and a third frame is scanned with a light signal shifted by a ⅔ pixel from the first frame;

DETAILED DESCRIPTION

According to one embodiment, an image processing apparatus has:
- a light source that emits a light signal at a predetermined time interval;
- a scanner capable of changing at least one of a scanning range or a scanning timing of the light signal for each of frames;
- a light receiver that receives a reflected light signal reflected on an object by irradiating the object with the light signal; and
- processing circuitry,
- wherein the processing circuitry is configured to: generate a distance image for each of the frames based on the reflected light signal received by the light receiver; and synthesize the distance images of a plurality of the frames to generate a high-resolution distance image.

First Embodiment

Figure 1:
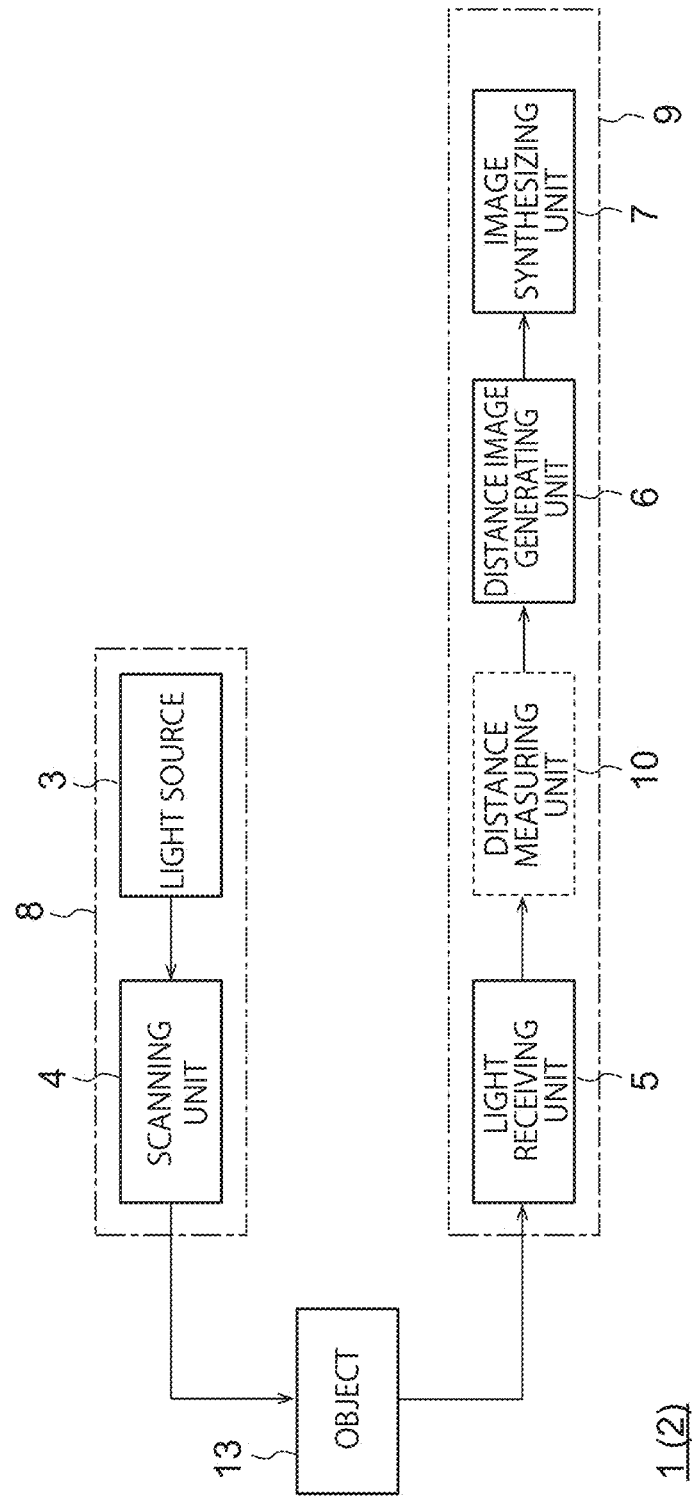
FIG. 1 is a block diagram illustrating a schematic configuration of an image processing apparatus according to a first embodiment.

FIG. 1 is a block diagram illustrating a schematic configuration of an image processing apparatus 1 according to a first embodiment. The image processing apparatus 1 illustrated in FIG. 1 is built in, for example, a distance measuring apparatus 2, Hardware configurations of the image processing apparatus 1 and the distance measuring apparatus 2 will be described later.

The image processing apparatus 1 illustrated in FIG. 1 includes a light source 3, a scanning unit 4, a light receiving unit 5, a distance image generating unit 6, and an image synthesizing unit 7. The light source 3 and the scanning unit 4 illustrated in FIG. 1 constitute a projector 8. The light receiving unit 5, the distance image generating unit 6, and the image synthesizing unit 7 constitute a light receiver 9.

The light source 3 emits a plurality of light signals at predetermined time intervals. More precisely, each of the light signals emitted from the light source 3 is a light pulse signal having a predetermined pulse width. The light source 3 emits, for example, the light pulse signals including laser light or LED light. The light source 3 may include a plurality of light emitting elements, and each of the light emitting elements may emit a plurality of light signals at the same time.

The scanning unit 4 can change at least one of the range of scanning with a light signal and the timing of the scanning with the light signal for each frame. The scanning unit 4 is configured using, for example, a polygon mirror, a micro electro mechanical system (MEMS) mirror, or the like. The scanning unit 4 changes the traveling direction of the light signal emitted from the light source 3 according to time, thereby performing the scanning with the light signal in a one-dimensional direction or a two-dimensional direction. Each frame is one frame of a still image acquired by scanning a field of view (FoV) of the distance measuring apparatus 2. The distance image generating unit 6 described later generates a distance image in units of frames.

The scanning unit 4 can change the range of scanning with a light signal in each frame, That is, at least parts of ranges of scanning with light signals in a predetermined number of adjacent frames may be different. The predetermined number is two or more.

The scanning unit 4 can change the timing of the scanning with the light signal in each frame. In this case, the ranges of the scanning with the light signals in the frames may be the same or different. The scanning unit 4 can change the scanning timing by, for example, changing the timing of emitting a light signal from the light source 3 for each frame.

The light receiving unit 5 receives a reflected light signal obtained by irradiating an object 13 with the light signal and reflecting the light signal on the object 13, The light receiving unit 5 includes a plurality of light receiving elements arranged in a one-dimensional direction or a two-dimensional direction. The light signal received by each light receiving element is converted into, for example, a luminance signal, and a distance signal is finally generated. In the present specification, the luminance signal or the distance signal corresponding to the light signal received by each light receiving element may be referred to as a pixel. As described above, the distance image generated in units of frames includes a plurality of pixels, and the pixels correspond to the respective different light receiving elements. The object 13 is irradiated with the light signal with which the scanning is performed by the scanning unit 4, and the reflected light signal from the object 13 is received by one or more of the light receiving elements. The scanning unit 4 can change the range of the scanning with the light signal for each frame.

The distance image generating unit 6 generates a distance image for each frame based on the reflected light signal received by the light receiving unit 5. The distance image generating unit 6 generates the distance images based on a time difference between the time when the light source 3 emits the light signal and the time when the light receiving unit 5 receives the reflected light signal.

The image synthesizing unit 7 synthesizes the distance images of the plurality of frames to generate a high-resolution distance image. As described later, the distance image generating unit 6 can generate a plurality of distance images by making at least one of the range of the scanning with the light signal and the timing of the scanning with the light signal different for each frame. Therefore, the image synthesizing unit 7 can easily generate the high-resolution distance image by synthesizing the plurality of distance images.

The beam width of the reflected light signal received by the light receiving unit 5 does not necessarily match the size of each light receiving element in the light receiving unit 5. When the beam width is wider than the width of the light receiving element, the S/N ratio may decrease, the measurable distance may be limited, or the resolution of the distance image may decrease.

The distance measuring apparatus 2 can be configured by adding a distance measurement unit 10 to the block configuration of the image processing apparatus 1 illustrated in FIG. 1. The distance measurement unit 10 measures the distance to the object 13 based on the time when the reflected light signal is received by the light receiving unit 5 and the time when the light signal is emitted from the light source 3.

Figure 2A:
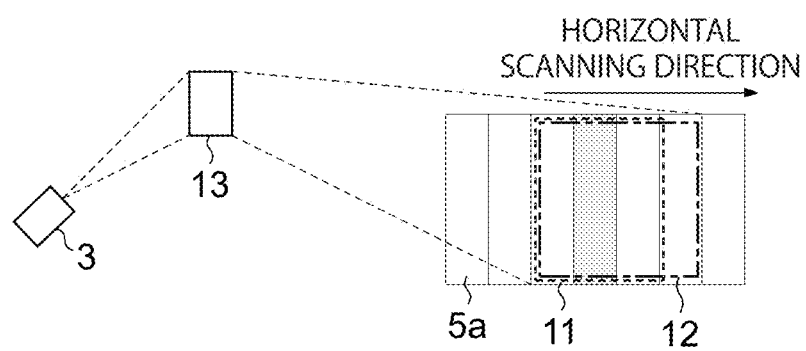
FIG. 2A is a diagram illustrating an example in which a beam width of a reflected light signal is three times a size of a light receiving element.
Figure 2B:
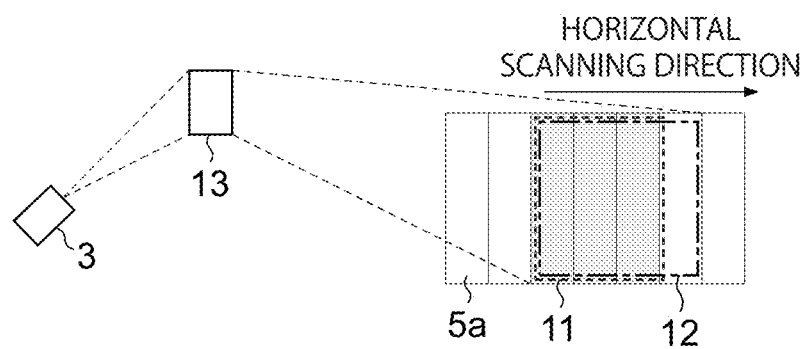
Figure 23:
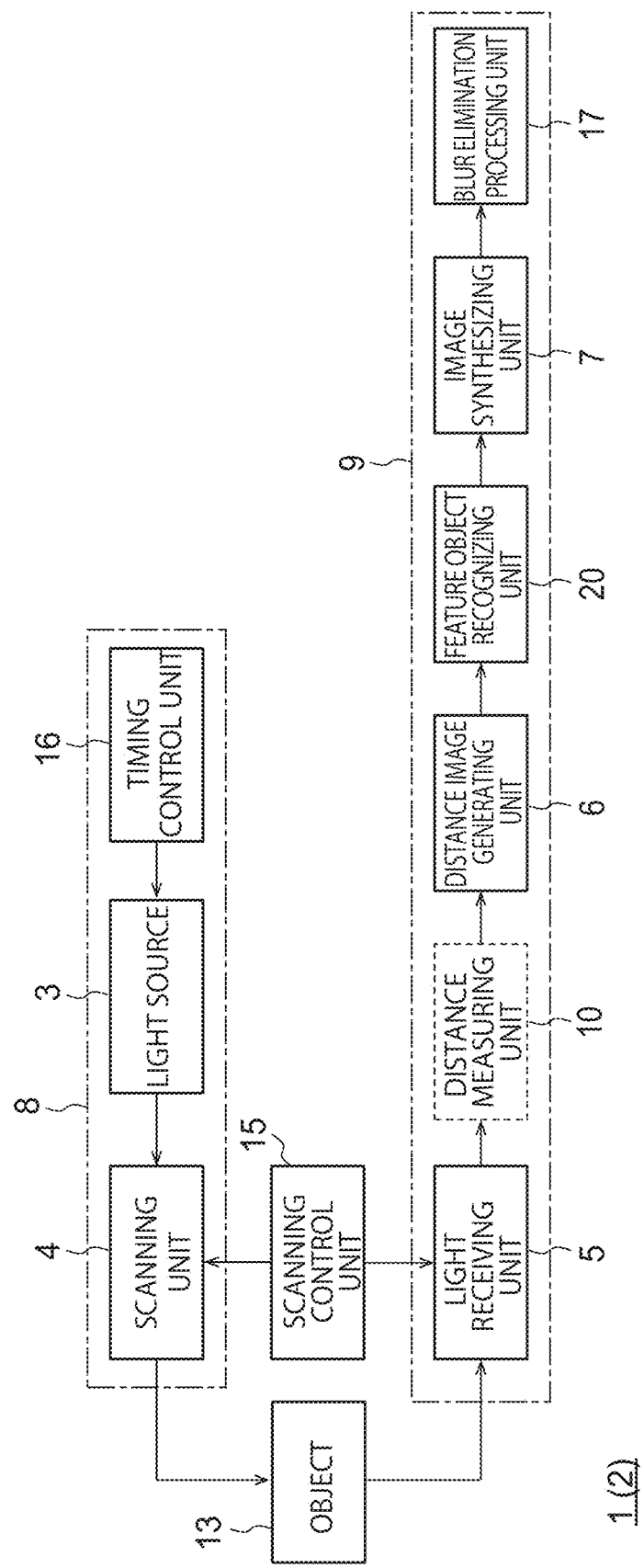
FIG. 23 is a diagram illustrating an example in which the reflected light signal is received in units of three light receiving elements in accordance with the beam width of the reflected light signal.

FIGS. 2A and 2B are diagrams illustrating a relationship between the beam width of the reflected light signal received by the light receiving unit 5 and the size of the light receiving element 5a in the light receiving unit 5. In FIGS. 2A and 23, a dashed line frame 11 indicates the beam width, and an alternate long and short dash line frame 12 indicates the detection range of the object 13. FIGS. 2A and 23 illustrate an example in which the beam width is the size of 3 pixels and the object 13 has a size of 4 pixels.

FIG. 2A illustrates an example in which the beam width of the reflected light signal is three times the size of the light receiving element 5a. In this case, the intensity S of the received light at each pixel of the distance image is ⅓ of the light intensity of the reflected light signal. When ambient light noise N incident on each pixel is 1, the S/N ratio is ⅓. Therefore, the total signal intensity (S N)=1.33, which is the sum of the intensity S of the received light and the ambient light noise N. In the case of FIG. 2A, when the beam width is 30, the pixel resolution is 10.

As described above, in the case of FIG. 2A, the effective resolution of the distance image is the same as the width of each pixel, but the measurable distance is limited because the total signal intensity is low.

FIG. 23 illustrates an example in which the reflected light signal is received in units of three light receiving elements 5a in accordance with the beam width of the reflected light signal. In FIG. 23, since one pixel is constituted by three light receiving elements 5a, the intensity S of the received light at each pixel is the same as the light intensity of the reflected light signal (S=1). Since three light receiving elements 5a are present in one pixel, the ambient light noise N incident on one pixel is N=3. Therefore, the S/N ratio is ⅓. The total signal intensity (S N) obtained by summing the intensity S of the received light and the ambient light noise N is 4. In the case of FIG. 23, when the beam width is 30, the effective resolution is 30.

As described above, in the case of FIG. 23, since the reflected light signal is received in units of three pixels in accordance with the beam width of the reflected light signal, the measurable distance range can be widened, but the effective resolution is degraded more than the pixel resolution.

As can be seen from FIGS. 2A and 23, when the resolution of the distance image is increased, the S/N ratio decreases, and the measurable distance range is narrowed. On the other hand, when the reflected light signal is received in units of the plurality of light receiving elements 5a, the measurable distance range can be widened, but the resolution of the distance image is lowered.

In addition, there is a problem that the larger the beam width of the reflected light signal, the more blurred the edge of the distance image and the lower the resolution.

Figure 3A:
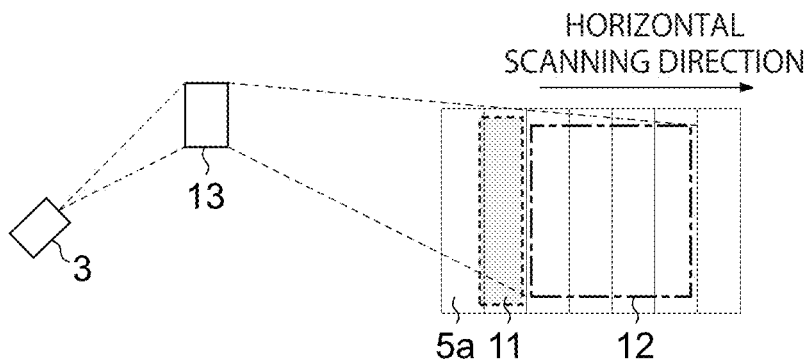
FIG. 3A is a diagram illustrating an example in which a beam width of a reflected light signal is the same as the width of the light receiving element.

FIG. 3A is a diagram illustrating an example in which the beam width of the reflected light signal is the same as the width of the light receiving element 5a, In FIG. 3A, a dashed line frame 11 indicates the beam width, and an alternate long and short dash line frame 12 indicates the detection range of the object 13. An example is illustrated in which the beam width is the size of one pixel and the object 13 has a size of four pixels.

Figure 3B:
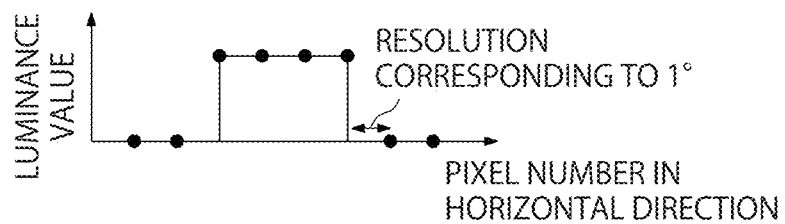
FIG. 3C is a diagram illustrating distance information of the object.
Figure 3C:
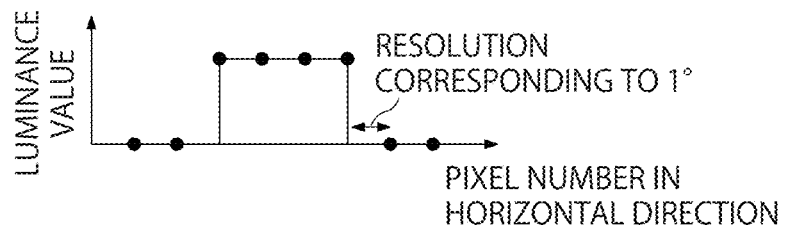
Figure 33:
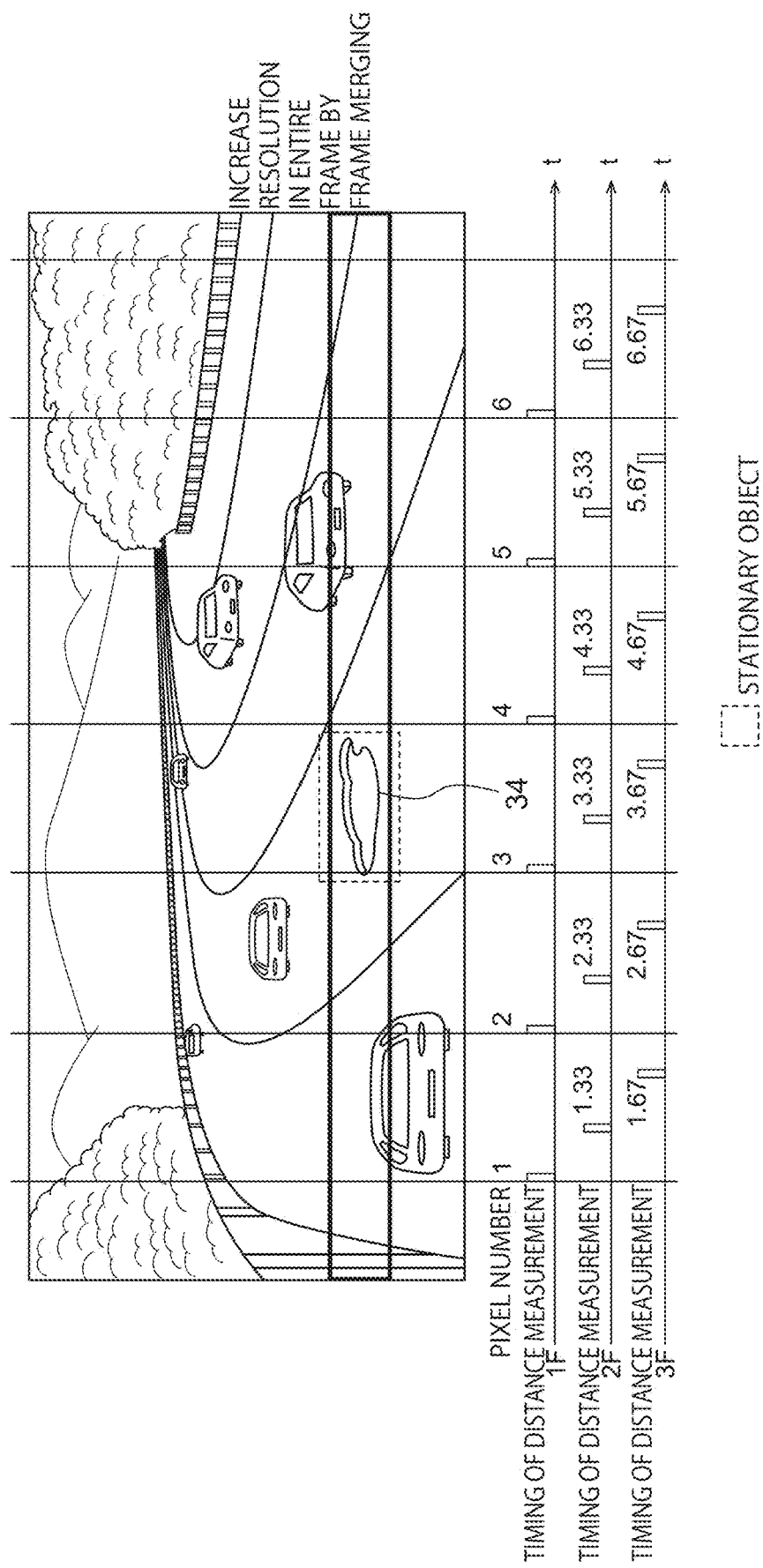
FIG. 33 is a diagram illustrating luminance information of an object.

FIG. 3B is a diagram illustrating luminance information of the object 13, and FIG. 3C is a diagram illustrating distance information of the object 13. The horizontal axis in FIGS. 33 and 3C represents a pixel number corresponding to each light receiving element 5a, the vertical axis in FIG. 33 represents the luminance value of the object 13, and the vertical axis in FIG. 3C represents the distance to the object 13. In the case of FIG. 3A, since the beam width of the reflected light signal matches the width of the light receiving element 5a, both the luminance information and the distance information change steeply, and edges of the luminance information and the distance information become clear.

Figure 4A:
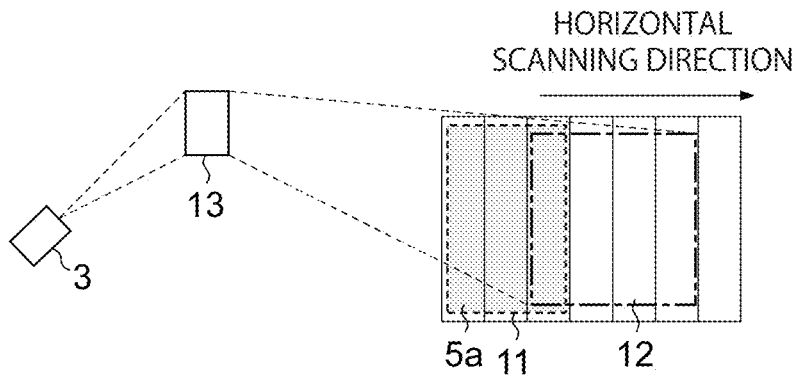
FIG. 4A is a diagram illustrating an example in which a beam width of a reflected light signal is a size of three pixels.

FIG. 4A is a diagram illustrating an example in which the beam width of the reflected light signal is the size of three pixels. In FIG. 4A, a dashed line frame 11 indicates the beam width, and an alternate long and short dash line frame 12 indicates the detection range of the object 13. FIG. 4A illustrates an example in which the beam width is the size of three pixels and the object 13 has a size of four pixels.

Figure 4B:
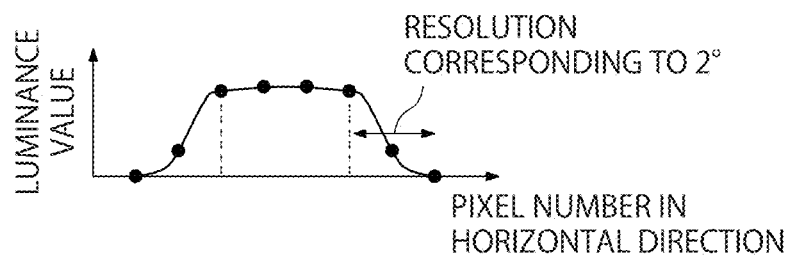
FIG. 4C is a diagram illustrating distance information of the object.
Figure 4C:
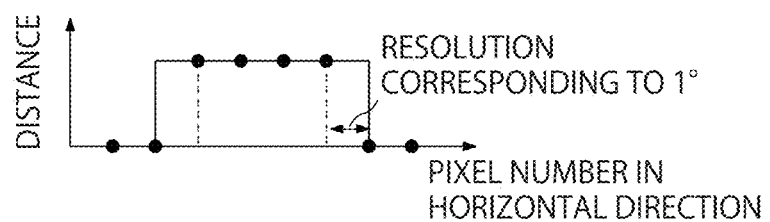

FIG. 43 is a diagram illustrating luminance information of the object 13, and FIG. 4C is a diagram illustrating distance information of the object 13. The horizontal axis in FIGS. 43 and 4C represents a pixel number corresponding to each light receiving element 5a, the vertical axis in FIG. 43 represents the luminance value of the object 13, and the vertical axis in FIG. 4C represents the distance to the object 13. The position of the object 13 is originally within the range of two broken lines in each of FIGS. 4B and 4C. However, the information of the object 13 is detected also outside the broken lines. The object information outside the two broken lines is detection error.

In the case of FIG. 4A, since the beam width of the reflected light signal is the size of three pixels, only the resolution coarser than the pixel resolution can be obtained, and edges of the luminance information become unclear. Therefore, when the distance information is obtained based on the luminance information, error information is included as illustrated in FIGS. 4B and 4C.

Figure 5:
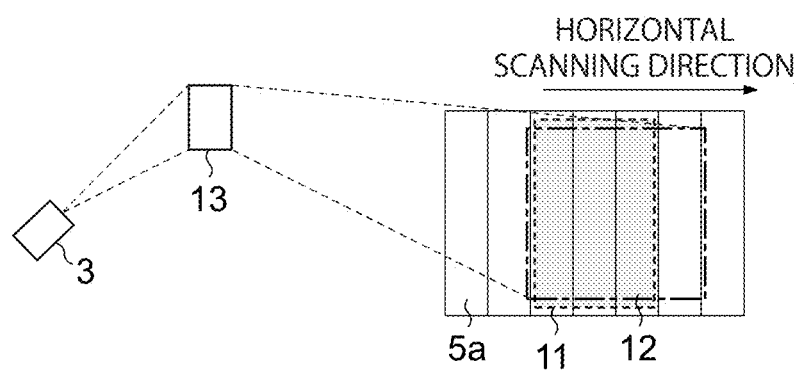
FIG. 5 is a diagram describing a reason why the distance information includes detection error.

FIG. 5 is a diagram describing a reason why the distance information includes detection error. Similarly to FIG. 4A, FIG. illustrates an example in which the beam width of the reflected light signal is the size of three pixels and the object 13 has a size of four pixels.

Figure 6A:
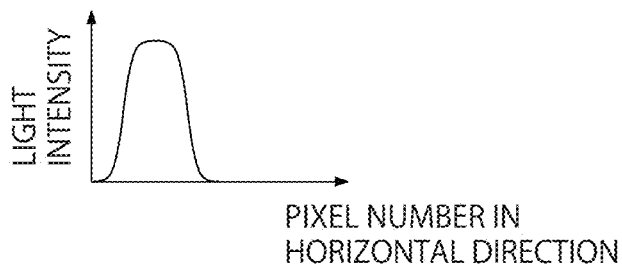
FIG. 6A is a diagram illustrating a light intensity distribution of a light signal emitted from a light source.

FIG. 6A is a diagram illustrating a light intensity distribution of a light signal emitted from the light source 3, where the horizontal axis represents a pixel number in a horizontal (scanning) direction, and the vertical axis represents the light intensity. The light intensity distribution in FIG. 6A is known.

Figure 6B:
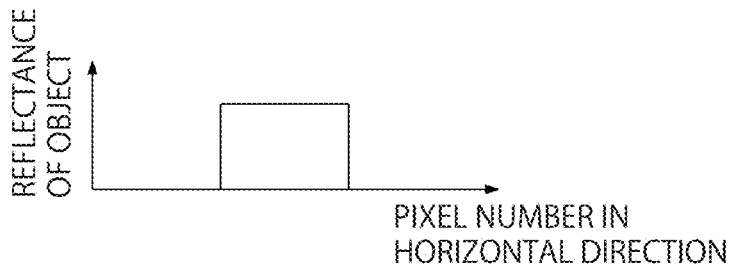
FIG. 6B is a diagram illustrating reflectance of the object.

FIG. 6B is a diagram illustrating the reflectance of the object 13, where the horizontal axis represents a pixel number in the horizontal (scanning) direction, and the vertical axis represents the reflectance. The reflectance of the object 13 is different for each object 13. The length between a rising point and a falling point in the horizontal axis varies depending on the size of the object 13.

Figure 6C:
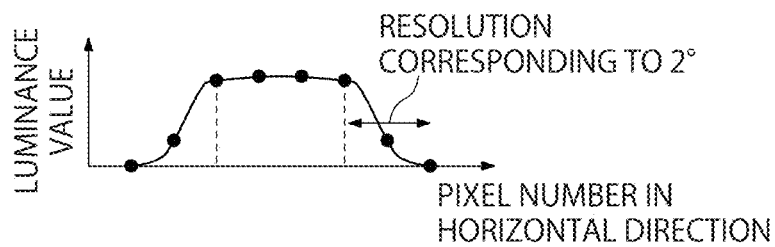
FIG. 6C is a diagram illustrating luminance information of the object.
Figure 6D:
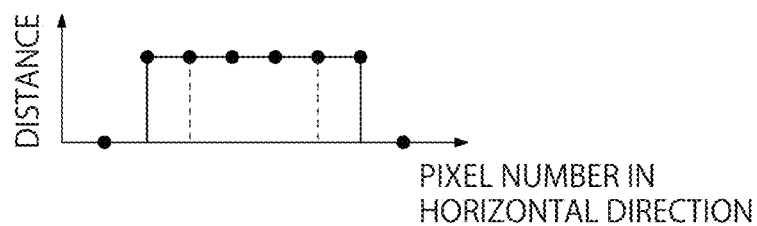
FIG. 6D is a diagram illustrating distance information of the object.

FIG. 6C is a diagram illustrating luminance information of the object 13, and FIG. 6D is a diagram illustrating distance information of the object 13. The horizontal axis in FIGS. 6C and 6D represents a pixel number corresponding to each light receiving element 5a, the vertical axis in FIG. 6C represents the luminance value of the object 13, and the vertical axis in FIG. 6D represents the distance to the object 13.

The luminance value of the object 13 is obtained by performing convolution processing on the light intensity g[n] of the light signal and the reflectance f[n] of the object 13 as expressed by the following Equation (1).

$$f[n] \times g[n] = \Sigma f[m] \times g[n-m] \quad (1)$$

When the beam width of the reflected light signal is wider than the width of the light receiving element 5a, the luminance distribution of the object 13 is convolved in the scanning direction as expressed in Equation (1). Therefore, a certain luminance value is detected even in a pixel outside a pixel corresponding to the original detection position of the object 13, and an edge of the luminance information of the object 13 becomes unclear.

Figure 7:
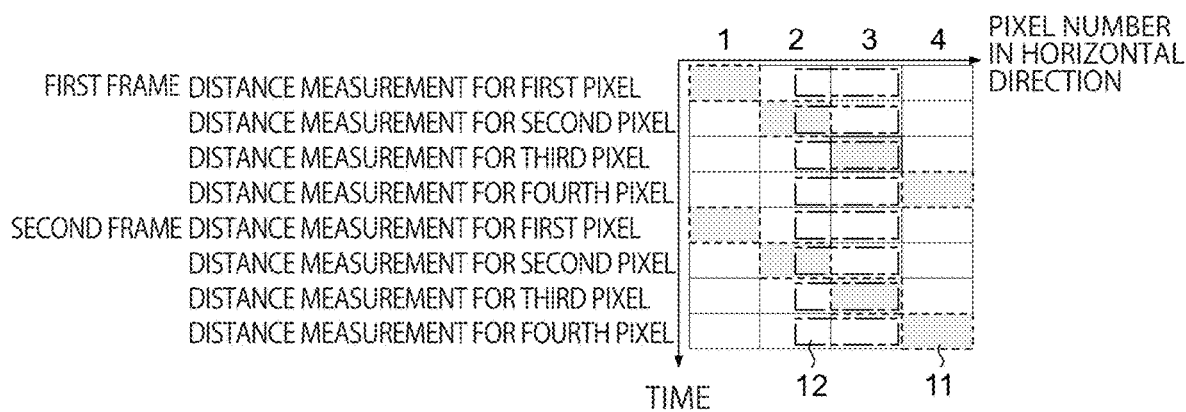
FIG. 7 is a diagram illustrating a distance measurement sequence of a distance measuring apparatus according to a comparative example.

FIG. 7 is a diagram illustrating a distance measurement sequence of a distance measuring apparatus 2 according to a comparative example. FIG. 7 illustrates an example in which each frame has four pixels in the scanning direction. In FIG. 7, a dashed line frame 11 indicates the beam width of a reflected light signal, and an alternate long and short dash line frame 12 indicates the detection range of the object 13.

Figure 8A:
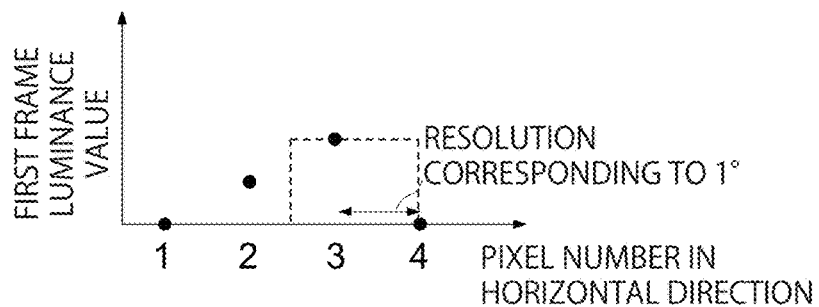
FIG. 8A is a diagram illustrating luminance information of a first frame detected by the distance measuring apparatus and illustrated in FIG. 7.

FIG. 8A is a diagram illustrating luminance information of a first frame detected by the distance measuring apparatus 2 and illustrated in FIG. 7, and FIG. 83 is a diagram illustrating luminance information of a second frame detected by the distance measuring apparatus 2 and illustrated in FIG. 7. In FIGS. 8A and 83, the horizontal axis represents a pixel number, and the vertical axis represents luminance information of the reflected light signal. In each of the plots of FIGS. 8A and 83, a solid line indicates a light receiving position where the reflected light signal is received, and a broken line indicates a case where the object can be ideally detected.

Figure 8B:
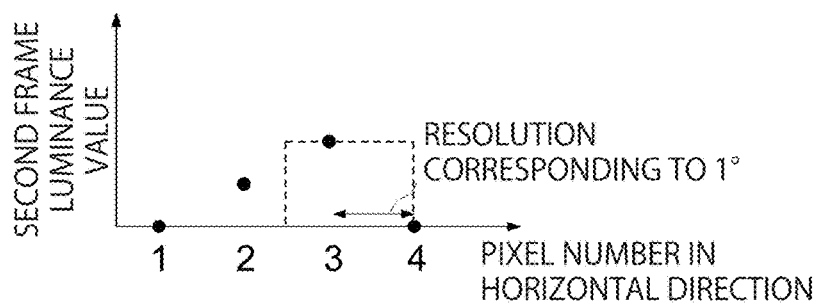
FIG. 8B is a diagram illustrating luminance information of a second frame detected by the distance measuring apparatus and illustrated in FIG. 7.

As illustrated in FIG. 7, the object 13 is not detected in the first pixel, the object 13 is detected only in a part of the second pixel, the object 13 is detected in the entire region of the third pixel, and the object 13 is not detected in the fourth pixel. Therefore, as illustrated in FIGS. 8A and 8B, the luminance information becomes an intermediate level in the second pixel, the luminance information becomes the maximum level in the third pixel, and the luminance information becomes the minimum level in the first and fourth pixels.

Figure 9A:
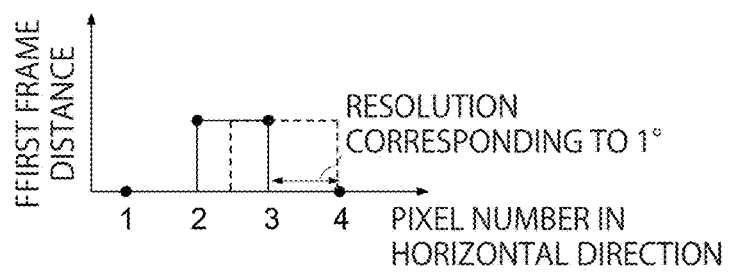
FIG. 9A is a diagram illustrating distance information of the object in the first frame detected by the distance measuring apparatus and illustrated in FIG. 7.
Figure 9B:
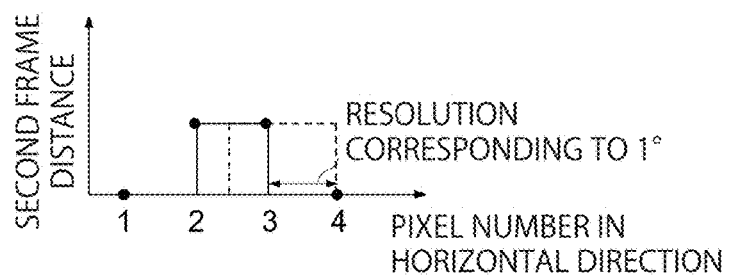
FIG. 9B is a diagram illustrating distance information of the object in the second frame detected by the distance measuring apparatus and illustrated in FIG. 7.

FIG. 9A is a diagram illustrating distance information of the object 13 in the first frame detected by the distance measuring apparatus 2 and illustrated in FIG. 7, and FIG. 9B is a diagram illustrating distance information of the object 13 in the second frame detected by the distance measuring apparatus 2 and illustrated in FIG. 7. In FIGS. 9A and 9B, the horizontal axis represents a pixel number, and the vertical axis represents the distance to the object 13. In each of the plots of FIGS. 9A and 9B, a solid line indicates a light receiving position where the reflected light signal is received, and a broken line indicates a case where the object can be ideally detected.

As illustrated in FIGS. 8A and 8B and FIGS. 9A and 93, since the distance measuring apparatus 2 performs the measurement with the same FoV, the same distance and the same luminance information are detected for pixel numbers 2 and 3. Therefore, the resolution corresponds to 1°.

Figure 10:
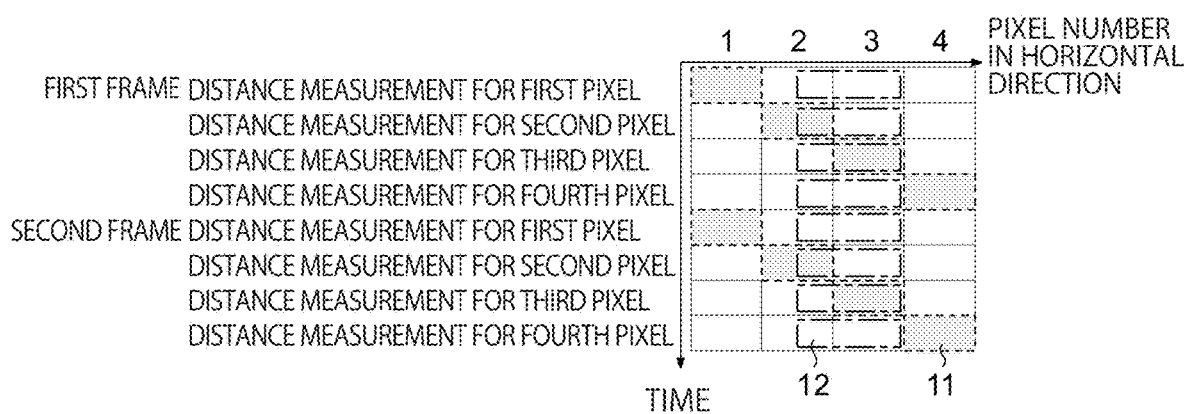
FIG. 10 is a diagram illustrating a distance measurement sequence of the image processing apparatus and a distance measuring apparatus according to the present embodiment.

FIG. 10 is a diagram illustrating a distance measurement sequence of the image processing apparatus 1 and the distance measuring apparatus 2 according to the present embodiment. FIG. 10 illustrates an example in which each frame has four pixels in the scanning direction, similarly to FIG. 7, In FIG. 10, a dashed line frame 11 indicates the beam width of the reflected light signal, and an alternate long and short dash line frame 12 indicates the detection range of the object 13.

Figure 11A:
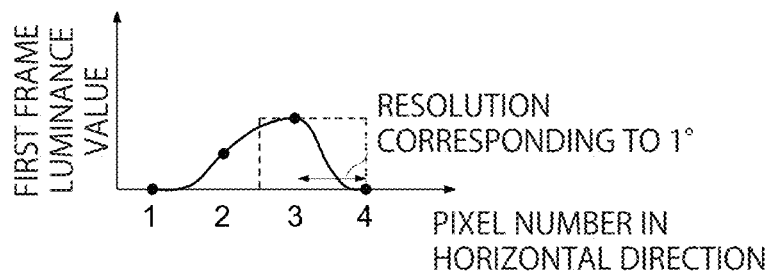
FIG. 11A is a diagram illustrating luminance information of a first frame detected by the distance measuring apparatus illustrated in FIG. 1.
Figure 11B:
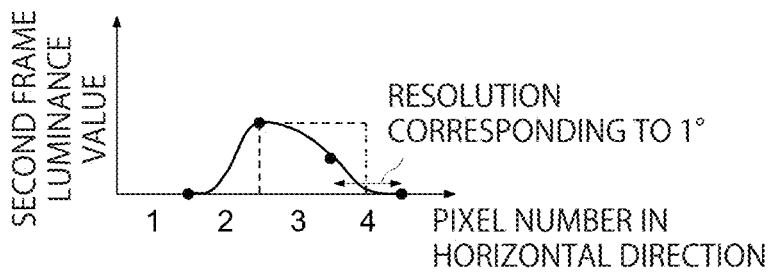
FIG. 11B is a diagram illustrating luminance information of a second frame detected by the distance measuring apparatus illustrated in FIG. 1.
Figure 11C:
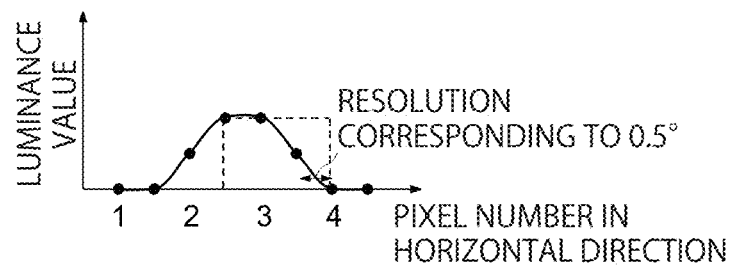
FIG. 11C is a diagram in which the luminance information illustrated in FIG. 11A is combined with the luminance information illustrated in 11B.

FIG. 11A is a diagram illustrating luminance information of the first frame detected by the distance measuring apparatus 2 illustrated in FIG. 1, FIG. 11B is a diagram illustrating luminance information of the second frame detected by the distance measuring apparatus 2 illustrated in FIG. 1, and FIG. 11C is a diagram in which the luminance information illustrated in FIG. 11A is combined with the luminance information illustrated in 11B. In FIGS. 11A to 11C, the horizontal axis represents a pixel number, and the vertical axis represents luminance information of the reflected light signal. In each of the plots of FIGS. 11A to 11C, a solid line indicates a light receiving position where the reflected light signal is received, and a broken line indicates a case where the object can be ideally detected.

The first frame illustrated in FIG. 10 is similar to the first frame illustrated in FIG. 7, and the luminance information of the reflected light signal of the first frame illustrated in FIG. 11A is the same as the luminance information illustrated in FIG. 8A.

For the second frame illustrated in FIG. 10, a light signal is emitted from the light source 3 with a delay of a ½ pixel from the first frame, Therefore, as illustrated in FIG. 11B, the luminance information of the reflected light signal of the second frame is detected with a delay of a ½ pixel from the luminance information illustrated in FIG. 11A. In a case where the scanning unit 4 performs scanning with a light signal at a constant speed, when the light signal is emitted from the light source 3 with a delay of a ½ pixel, the light signal is emitted to a position shifted by a ½ pixel with respect to the object 13, and the reflected light signal is received at a position shifted by a ½ pixel with respect to the light receiving unit 5.

When the luminance information of the first frame of the reflected light signal and the luminance information of the second frame of the reflected light signal are combined, luminance information as illustrated in FIG. 11C is obtained. The resolution of the luminance information in FIG. 11C is twice that of the luminance information in FIGS. 11A and 11B, and the luminance information can be detected more accurately.

Figure 12A:
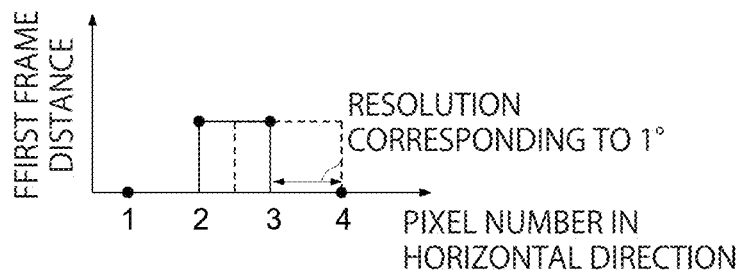
FIG. 12A is a diagram illustrating distance information of the object in the first frame detected by the image processing apparatus and the distance measuring apparatus and illustrated in FIG. 10.
Figure 12B:
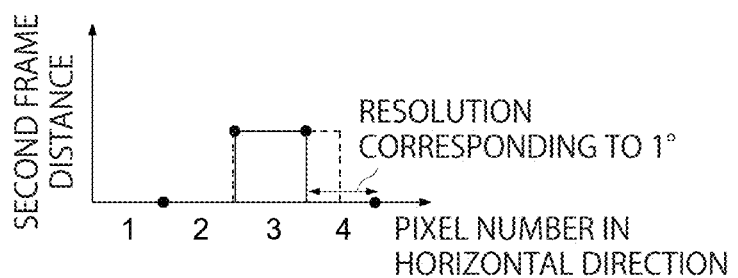
FIG. 12B is a diagram illustrating distance information of the object in the second frame detected by the image processing apparatus and the distance measuring apparatus and illustrated in FIG. 10.
Figure 12C:
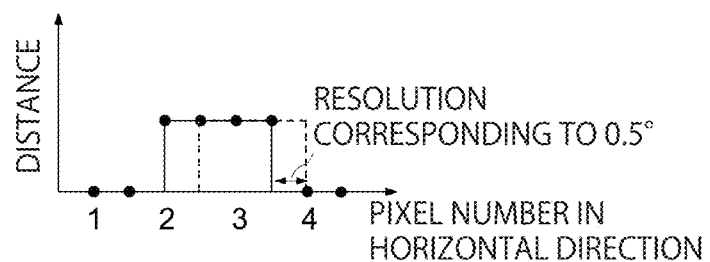
FIG. 12C is a diagram in which the distance information illustrated in FIG. 12A is combined with the distance information illustrated in 12B.

FIG. 12A is a diagram illustrating distance information of the object 13 in a first frame detected by the image processing apparatus 1 and the distance measuring apparatus 2 illustrated in FIG. 10, FIG. 12B is a diagram illustrating distance information of the object 13 in a second frame detected by the image processing apparatus 1 and the distance measuring apparatus 2 illustrated in FIG. 10, and FIG. 12C is a diagram in which the distance information illustrated in FIG. 12A is combined with the distance information illustrated in 12B. Each plot in FIGS. 12A to 12C indicates a detection position where the distance information is detected.

Since the light signal is emitted from the light source 3 with a delay of a ½ pixel from the first frame to detect the distance information of the object 13 for the second frame, the distance information of the object 13 is detected with a delay of a ½ pixel from the first frame.

By combining the distance information of the first frame with the distance information of the second frame, as illustrated in FIG. 12C, the distance to a portion of the object 13 present near the edge of the object 13 can be accurately detected, and the distance resolution can be improved.

The scanning unit 4 illustrated in FIG. 1 can change at least one of the range of scanning with a light signal and the timing of the scanning with the light signal for each frame. A plurality of specific examples can be considered as a method in which the scanning unit 4 performs scanning with a light signal.

Figure 13:
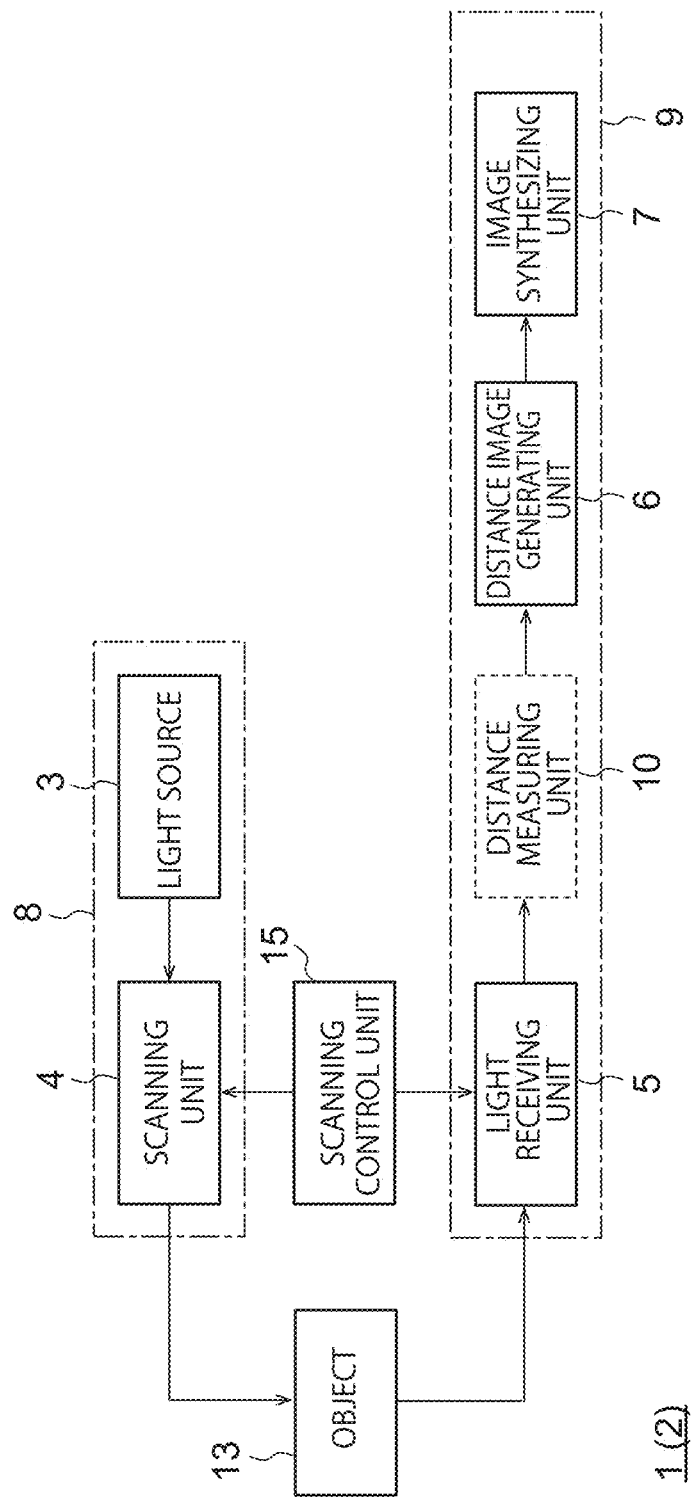
FIG. 13 is a block diagram of an image processing apparatus according to a first specific example of FIG. 1.

FIG. 13 is a block diagram of an image processing apparatus 1 according to a first specific example of FIG. 1. In FIG. 13, the same components as those in FIG. 1 are denoted by the same reference signs, and differences will be mainly described below. The light source 3 and the scanning unit 4 illustrated in FIG. 13 constitute a projector 8. The light receiving unit 5, the distance measurement unit 10, the distance image generating unit 6, and the image synthesizing unit 7 in FIG. 13 constitute a light receiver 9.

The image processing apparatus 1 illustrated in FIG. 13 includes a scanning control unit 15 in addition to the configuration illustrated in FIG. 1. The scanning control unit 15 controls the scanning unit 4. For example, the scanning control unit 15 switches and controls the light emission direction of the scanning unit 4. As will be described later, the scanning unit 4 includes a mirror member that switches the traveling direction of a light signal emitted from the light source 3, such as a polygon mirror or a MEMS mirror. The scanning control unit 15 may change the traveling direction of the light signal emitted from the scanning unit 4 for each frame by not only performing control to rotate the mirror surface of the mirror member but also rotating the mirror member itself within a predetermined angle range.

Alternatively, the scanning control unit 15 may switch and control the light emission direction of a housing unit in which the light source 3 is built. As a result, the traveling direction of the light signal emitted from the light source 3 can be changed, and the range of scanning with the light signal emitted from the scanning unit 4 can be changed for each frame.

Alternatively, the scanning control unit 15 may variably control the speed at which the scanning unit 4 switches the traveling direction of the light signal, That is, the scanning control unit 15 can variably control the resolution of the distance image by switching and controlling the speed of the scanning with the light signal by the scanning unit 4.

Figure 14:
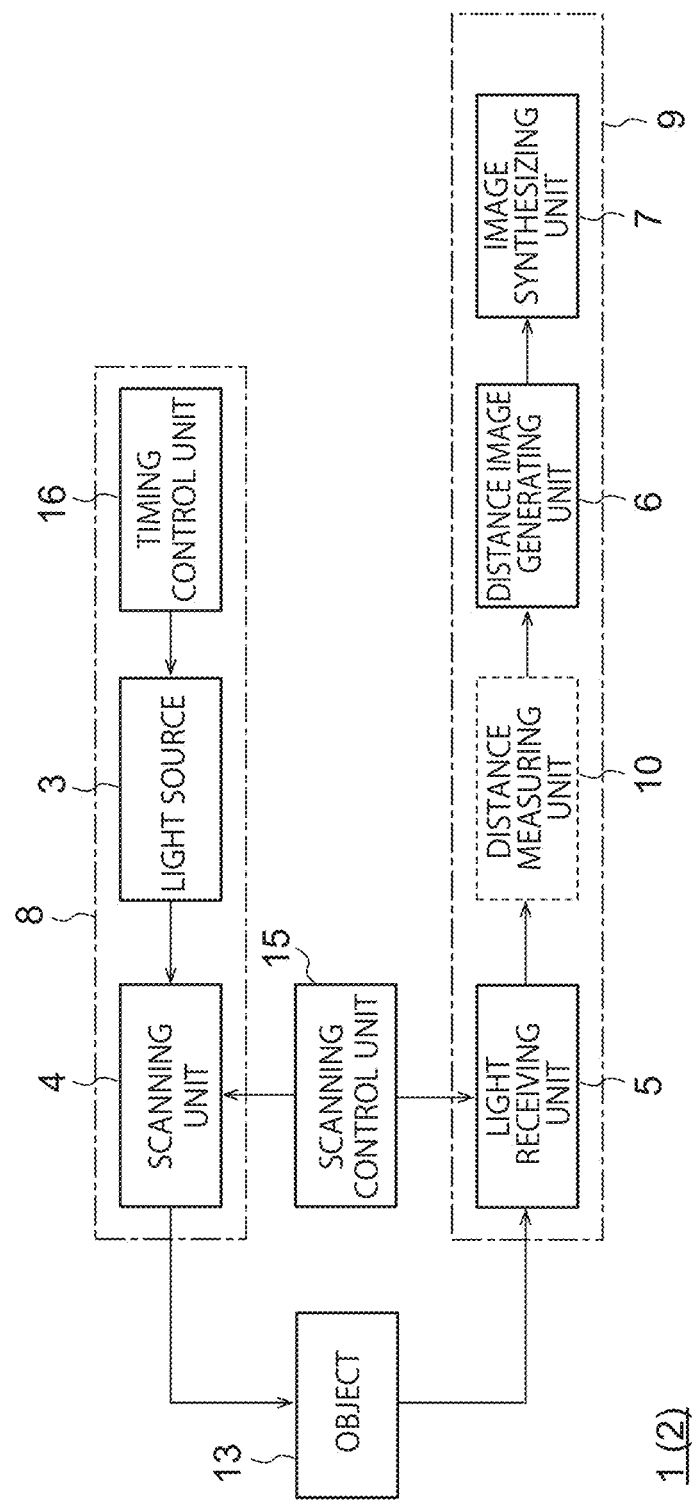
FIG. 14 is a block diagram of an image processing apparatus according to a second specific example of FIG. 1.

FIG. 14 is a block diagram of an image processing apparatus 1 according to a second specific example of FIG. 1. The image processing apparatus 1 illustrated in FIG. 14 includes a timing control unit 16 in addition to the configuration illustrated in FIG. 13.

The timing control unit 16 controls an emission start timing at which the light source 3 starts emitting a light signal. The scanning unit 4 switches the timing of scanning with the light signal for each frame based on the emission start timing at which the light source 3 starts emitting the light signal. The timing control unit 16 variably controls the emission start timing of the light signal for each frame without changing the emission interval of the light signal emitted from the light source 3.

More specifically, for each of consecutive n (n is an integer of 2 or more) frames, the light source 3 emits a plurality of light signals at the same emission interval starting from different emission start times. The image synthesizing unit 7 synthesizes distance images generated in each of the n frames.

Figure 15:
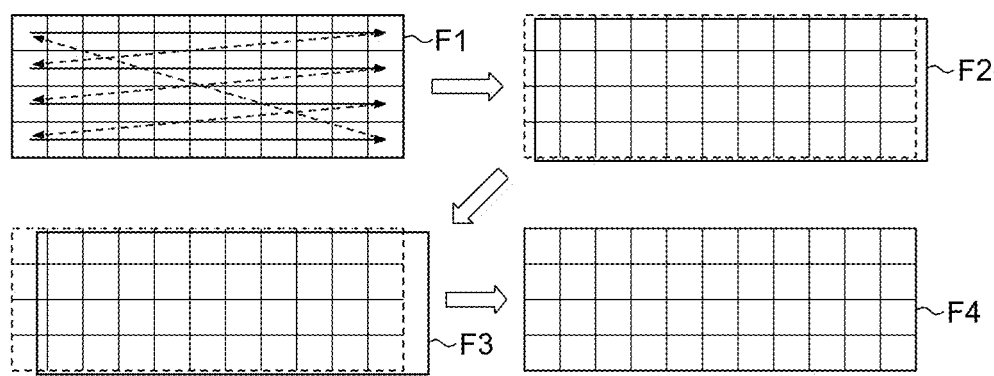
FIG. 15 is a diagram schematically illustrating an example in which a scanning unit changes at least one of the range of scanning with a light signal and the timing of the scanning with the light signal for each frame.

FIG. 15 is a diagram schematically illustrating an example in which the scanning unit 4 changes at least one of the range of scanning with a light signal and the timing of the scanning with the light signal for each frame. In a frame F1 illustrated in FIG. 15, the scanning unit 4 performs scanning with the light signal in the horizontal direction, and when the scanning of one horizontal line is completed, the operation of scanning the next horizontal line from left to right with the light signal is repeated for all horizontal lines. Each square in the frame F1 indicates a pixel received by each light receiving element 5a.

When a distance image of the frame F1 is generated, the light source 3 emits a light signal with a delay of a ⅓ pixel, and the reflected light signal from the object 13 is received by the light receiving unit 5 to generate a distance image in the next frame F2. A light signal is emitted from the light source 3 with a delay of a ⅔ pixel, and the reflected light signal from the object 13 is received by the light receiving unit 5 to generate a distance image in the next frame F3. A light signal is emitted from the light source 3 at the same timing as the frame F1 to generate a distance image in the next frame F4.

The image synthesizing unit 7 synthesizes the three distance images of the frames F1 to F3 to generate a high-resolution distance image. FIG. 15 illustrates an example in which the three distance images of the frames F1 to F3 are synthesized, but the number of distance images to be synthesized is arbitrary.

Figure 16:
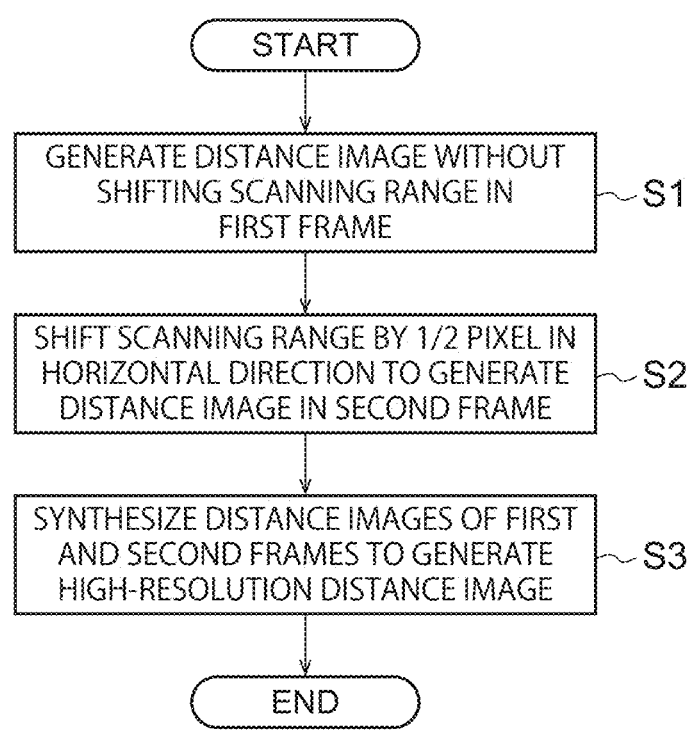
FIG. 16 is a flowchart illustrating a first example of a processing operation of the image processing apparatus and the distance measuring apparatus according to the first embodiment.
Figure 17A:
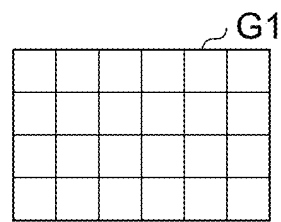
FIG. 17A is a diagram schematically illustrating a distance image generated in step S1 illustrated in FIG. 16.

FIG. 16 is a flowchart illustrating a first example of a processing operation of the image processing apparatus 1 and the distance measuring apparatus 2 according to the first embodiment. First, in the first frame, a distance image G1 is generated by scanning with a light signal without shifting the scanning range (step S1). FIG. 17A is a diagram schematically illustrating the distance image G1 generated in step S1 illustrated in FIG. 16. FIG. 17A illustrates an example of a distance image G1 having 6 pixels in the horizontal direction and 4 pixels in the vertical direction.

Figure 17B:
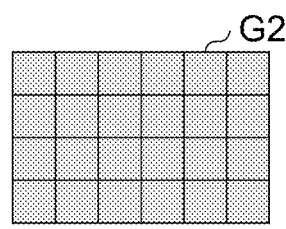
FIG. 17C is a diagram schematically illustrating a distance image generated in step S3 illustrated in FIG. 16.

Next, in the second frame, the scanning range is shifted (delayed) by a ½ pixel in the horizontal direction to generate a distance image G2 (step S2). FIG. 17B is a diagram schematically illustrating the distance image G2 generated in step S2 illustrated in FIG. 16.

Figure 17C:
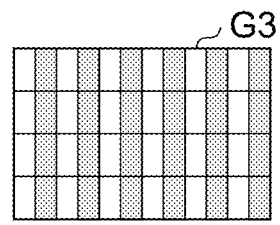

Next, the distance image G1 of the first frame and the distance image G2 of the second frame are synthesized to generate a high-resolution distance image G3 (step S3). FIG. 17C is a diagram schematically illustrating the distance image G3 generated in step S3 illustrated in FIG. 16. As illustrated in FIG. 17C, by synthesizing the distance images G1 and G2 for the two frames, it is possible to generate the high-resolution distance image G3 in which the resolution in the horizontal direction is doubled.

Figure 18:
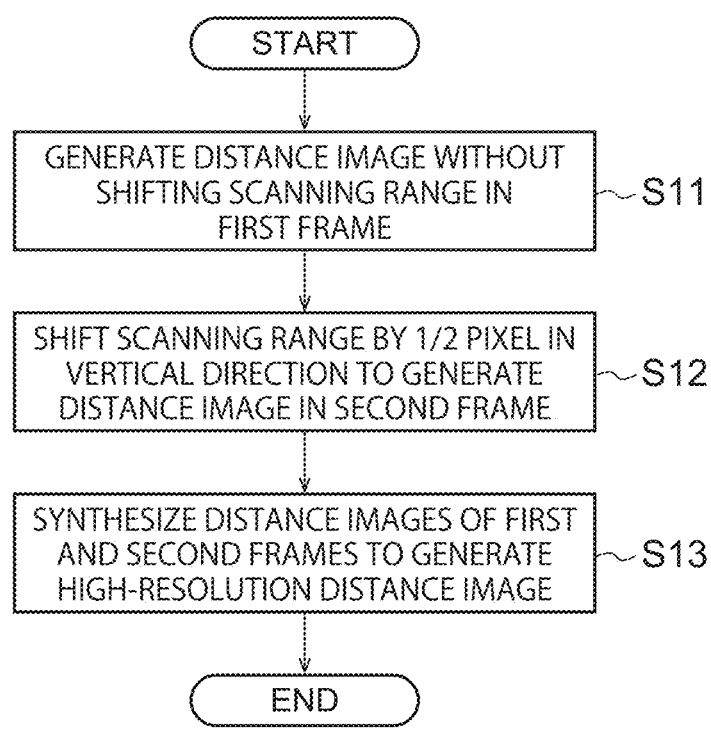
FIG. 18 is a flowchart illustrating a second example of a processing operation of the image processing apparatus and the distance measuring apparatus according to the first embodiment.
Figure 19A:
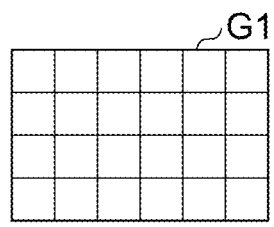
FIG. 19A is a diagram schematically illustrating a distance image generated in step S11 illustrated in FIG. 18.

FIG. 18 is a flowchart illustrating a second example of a processing operation of the image processing apparatus 1 and the distance measuring apparatus 2 according to the first embodiment. First, in the first frame, a distance image is generated by scanning with a light signal in a reference scanning range (step S11). FIG. 19A is a diagram schematically illustrating the distance image G1 generated in step S11 illustrated in FIG. 18.

Figure 19B:
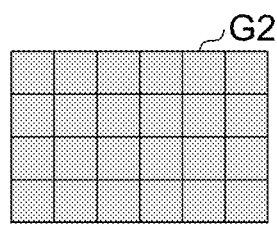
FIG. 19B is a diagram schematically illustrating a distance image generated in step S12 illustrated in FIG. 18.

Next, in the second frame, the scanning range is shifted (delayed) by a ½ pixel in the horizontal direction to generate a distance image (step S12). FIG. 19B is a diagram schematically illustrating the distance image G2 generated in step S12 illustrated in FIG. 18.

Figure 19C:
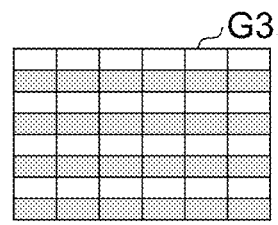
FIG. 19C is a diagram schematically illustrating a distance image generated in step S13 illustrated in FIG. 18.

Next, the distance image of the first frame and the distance image of the second frame are synthesized to generate a high-resolution distance image G3 (step S13). FIG. 19C is a diagram schematically illustrating the distance image generated in step S13 illustrated in FIG. 18. As illustrated in FIG. 19C, by synthesizing the distance images for the two frames, the resolution in the vertical direction can be doubled.

As described above, in the first embodiment, a plurality of distance images generated by changing at least one of the range of scanning with a light signal and the timing of the scanning with the light signal for each frame are synthesized to generate a high-resolution distance image. This makes it possible to increase the resolution of the distance image with a simple configuration without providing a lens or the like for reducing the beam width of the light signal emitted from the light source 3.

Second Embodiment

Figure 20:
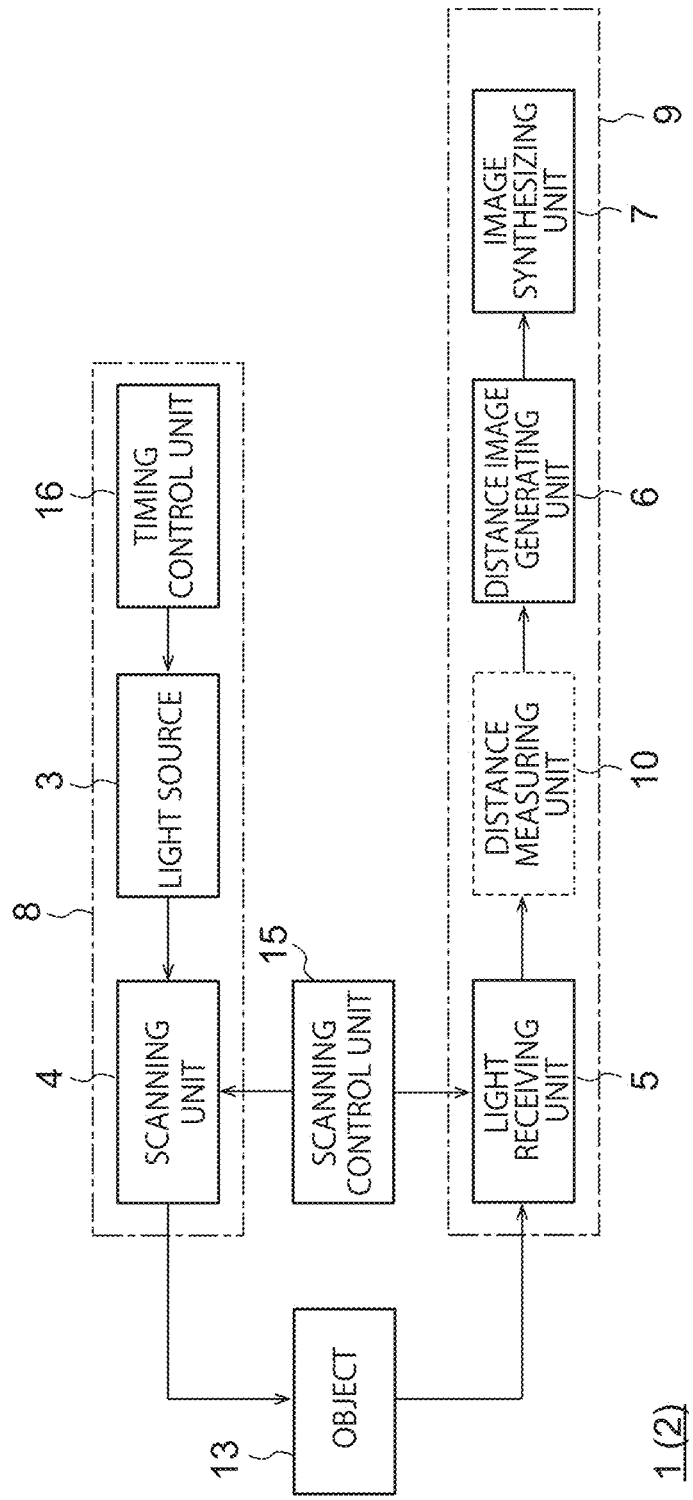
FIG. 20 is a block diagram illustrating a schematic configuration of an image processing apparatus according to a second embodiment.

FIG. 20 is a block diagram illustrating a schematic configuration of an image processing apparatus 1 according to a second embodiment. The image processing apparatus 1 illustrated in FIG. 20 is obtained by adding a blur elimination processing unit 17 to the configuration illustrated in FIG. 14.

Figure 21:
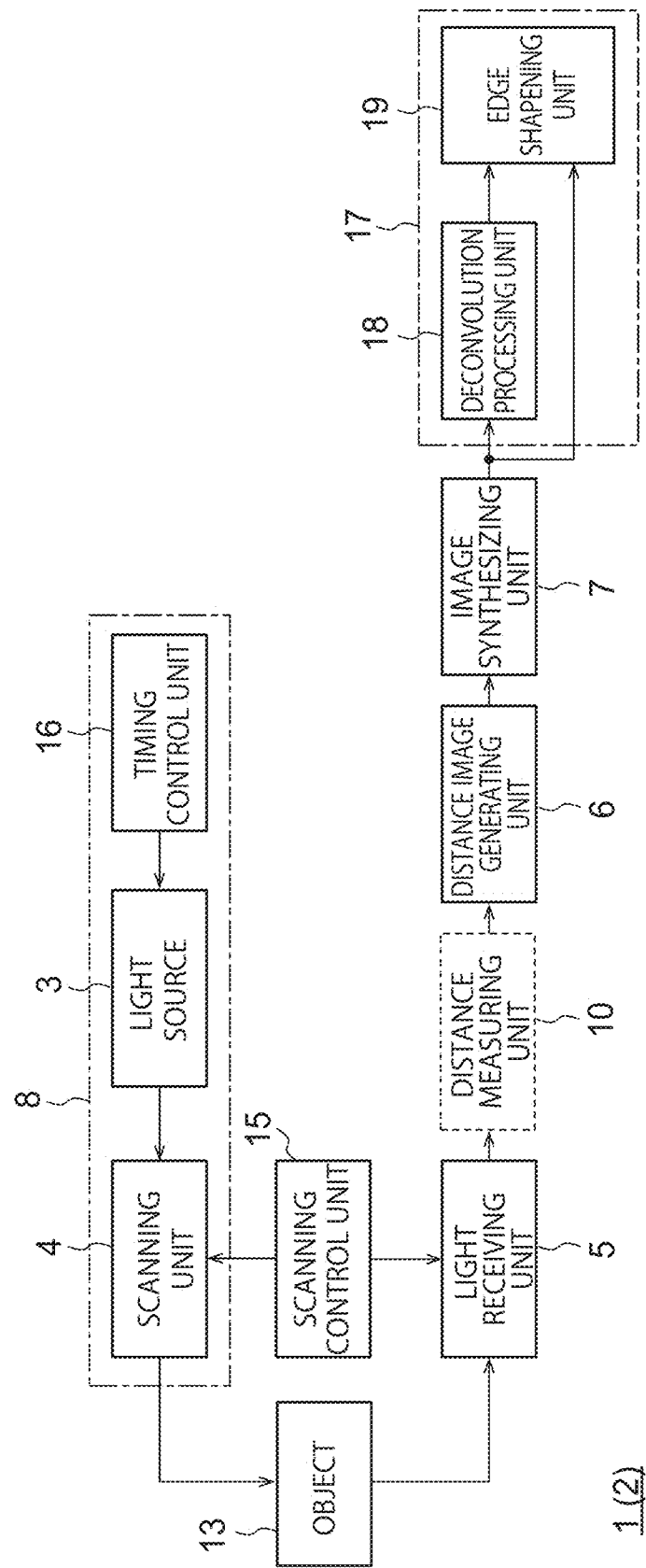
FIG. 21 is a block diagram of the image processing apparatus illustrated in FIG. 20, in which a blur elimination processing unit is further embodied.

The blur elimination processing unit 17 performs processing of making a high-resolution distance image generated by the image synthesizing unit 7 clearer. Specifically, the blur elimination processing unit 17 performs processing of eliminating a blur in an edge portion of a distance and luminance image and sharpening the edge portion, FIG. 21 is a block diagram of the image processing apparatus 1 illustrated in FIG. 20, in which the blur elimination processing unit 17 is further embodied. The blur elimination processing unit 17 illustrated in FIG. 21 includes a deconvolution processing unit 18 and an edge sharpening unit 19.

The deconvolution processing unit 18 performs deconvolution processing on the high-resolution distance image generated by the image synthesizing unit 7 using a light intensity distribution of a light signal emitted from the light source 3 to generate the reflectance of the object 13.

The edge enhancing unit 19 enhances an edge of the high-resolution distance image generated by the image synthesizing unit 7 based on the reflectance of the object 13 generated by the deconvolution processing unit 18.

Figure 22:
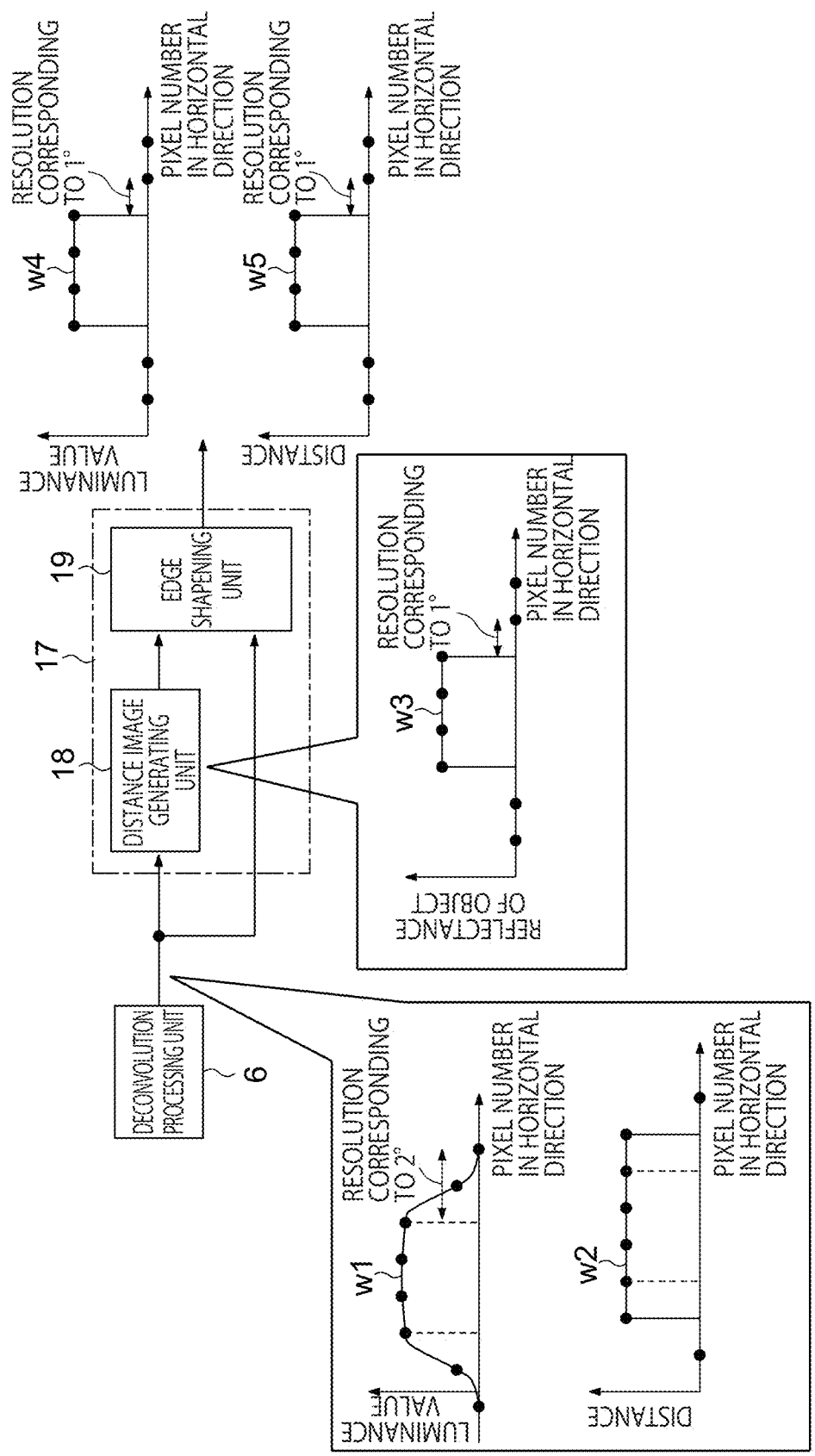
FIG. 22 is a diagram describing a processing operation of the blur elimination processing unit.

FIG. 22 is a diagram describing a processing operation of the blur elimination processing unit 17. The distance image generating unit 6 generates luminance information and distance information based on a light signal received by the light receiving unit 5. The luminance information generated by the distance image generating unit 6 is represented by, for example, a waveform w1, and the distance information is represented by, for example, a waveform w2. As can be seen from the waveforms w1 and w2, when the beam width of the reflected light signal is wider than the width of the light receiving element 5a, the luminance information and the distance information have values including errors.

The light intensity g[n] of the light signal emitted from the light source 3 is known. Therefore, the deconvolution processing unit 18 can generate the reflectance of the object 13 by performing the deconvolution processing of g[n] on the luminance information. The reflectance of the object 13 is represented by, for example, a waveform w3 illustrated in FIG. 22. The reflectance of the object 13 generated by the deconvolution processing unit 18 is information not including an error. The light intensity g[n] is obtained by measuring the light intensity in advance. Alternatively, the light intensity g[n] can also be obtained by acquiring an intensity distribution of laser light at each distance measurement using the light receiving elements provided in the projector.

The edge sharpening unit 19 corrects the luminance information generated by the distance image generating unit 6 based on the reflectance of the object 13 generated by the deconvolution processing unit 18, and also corrects the distance information. As a result, as indicated by waveforms w4 and w5, clear luminance information and distance information that have clear edges can be obtained.

In FIG. 22, the deconvolution processing is performed on the luminance information included in the distance image generated by the distance image generating unit 6, but as illustrated in FIG. 21, the deconvolution processing may be performed on the luminance information included in the high-resolution distance image generated by the image synthesizing unit 7. In this case, the edge enhancing unit 19 sets a threshold for a luminance signal corresponding to the reflected light signal received by the light receiving unit 5 based on the reflectance of the object 13 generated by the deconvolution processing unit 18, binarizes the luminance signal based on the threshold, and corrects the high-resolution distance image generated by the image synthesizing unit 7 based on the binarized luminance value. Alternatively, it is conceivable that the edge enhancing unit 19 estimates a luminance value corresponding to the reflected light signal received by the light receiving unit 5 based on the reflectance of the object 13 generated by the deconvolution processing unit 18, and corrects the high-resolution distance image generated by the image synthesizing unit 7 based on the luminance value.

As described above, in the second embodiment, the reflectance of the object 13 is generated by performing the deconvolution processing of the light intensity of the light signal on the luminance information based on the light signal received by the light receiving unit 5, and the luminance information and the distance information are corrected based on the generated reflectance of the object 13. As a result, it is possible to eliminate a blur in a high-resolution distance image generated by the image synthesizing unit 7 and to enhance an edge.

Third Embodiment

FIG. 23 is a block diagram illustrating a schematic configuration of an image processing apparatus 1 according to a third embodiment. The image processing apparatus 1 illustrated in FIG. 23 includes a feature object recognizing unit 20 in addition to the configuration illustrated in FIG. 20.

The feature object recognizing unit 20 recognizes a feature object included in a distance image generated by the distance image generating unit 6. The feature object is, for example, a stationary object that satisfies a predetermined condition. The predetermined condition is that the stationary object is not present before a predetermined period, for example. Specific examples of the feature object include a depression on a road, an obstacle placed on a road, and the like.

The image synthesizing unit 7 generates a high-resolution distance image at a first frame rate for the feature object, and generates a distance image at a second frame rate higher than the first frame rate without changing the resolution for a region other than the feature object. Note that, as described later, the feature object recognizing unit 20 may recognize a moving object. The image synthesizing unit 7 generates a distance image at the second frame rate without changing the resolution for the moving object recognized by the feature object recognizing unit 20.

Figure 24:
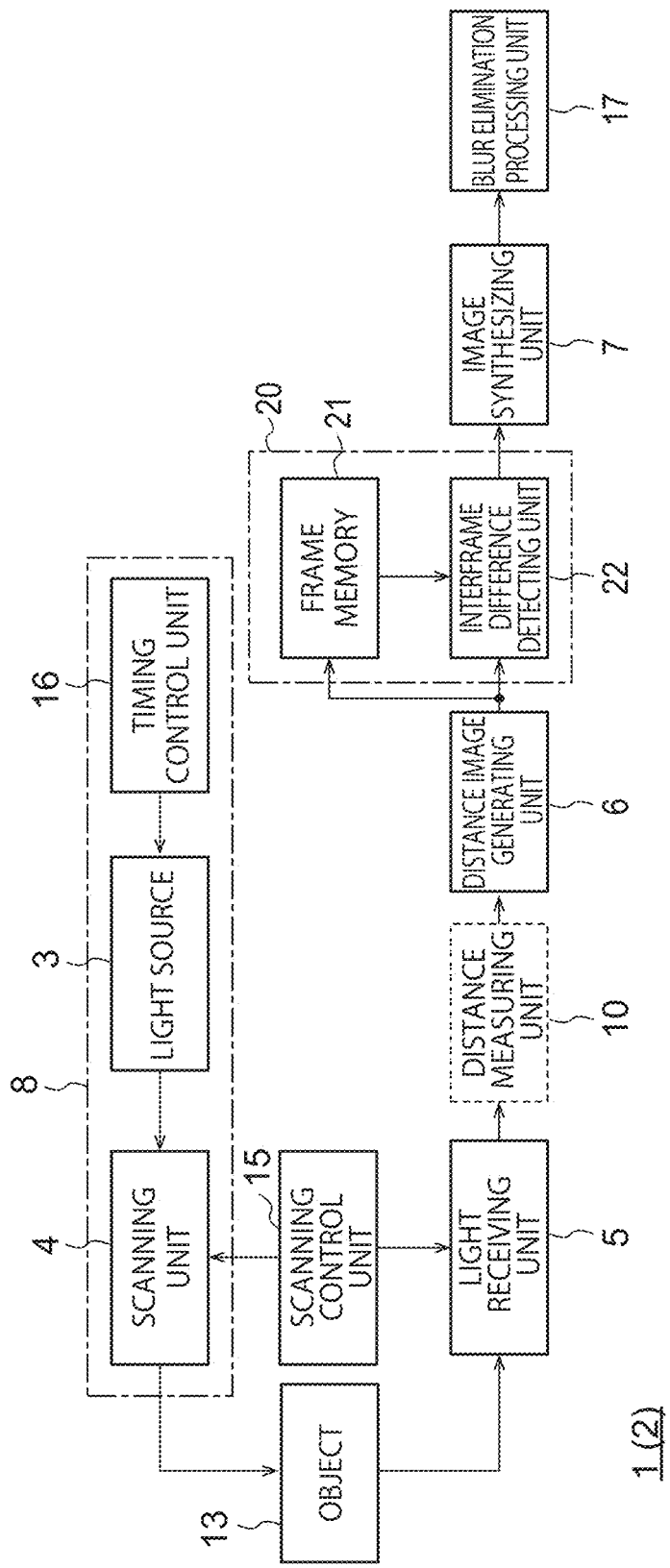
FIG. 24 is a block diagram illustrating the image processing apparatus illustrated in FIG. 23, in which a feature object recognizing unit is further embodied.

FIG. 24 is a block diagram illustrating the image processing apparatus 1 illustrated FIG. 23, in which the feature object recognizing unit 20 is further embodied. The feature object recognizing unit 20 illustrated in FIG. 24 includes a frame memory 21 and an interframe difference detecting unit 22.

The frame memory 21 stores a distance image for at least one frame. The interframe difference detecting unit 22 detects a difference between distance images of a plurality of frames and recognizes a feature object.

More specifically, the interframe difference detecting unit 22 may include a first recognizing unit and a second recognizing unit. The first recognizing unit takes a difference between a distance image generated by the distance image generating unit 6 and a distance image generated before a predetermined period, thereby recognizing a feature object that is not present before the predetermined period and is stationary. The second recognizing unit recognizes the moving object 13 by taking a difference between a plurality of distance images generated most recently by the distance image generating unit 6.

For example, the image synthesizing unit 7 generates a high-resolution distance image at a first frame rate in a region including the feature object based on a result of the recognition by the first recognizing unit, and generates a distance image at a second frame rate higher than the first frame rate in a region not including the feature object. Alternatively, the image synthesizing unit 7 generates a high-resolution distance image at the first frame rate in a region including the feature object recognized by the first recognizing unit, and generates a distance image at the second frame rate in a region including the moving object recognized by the second recognizing unit.

Figure 25:
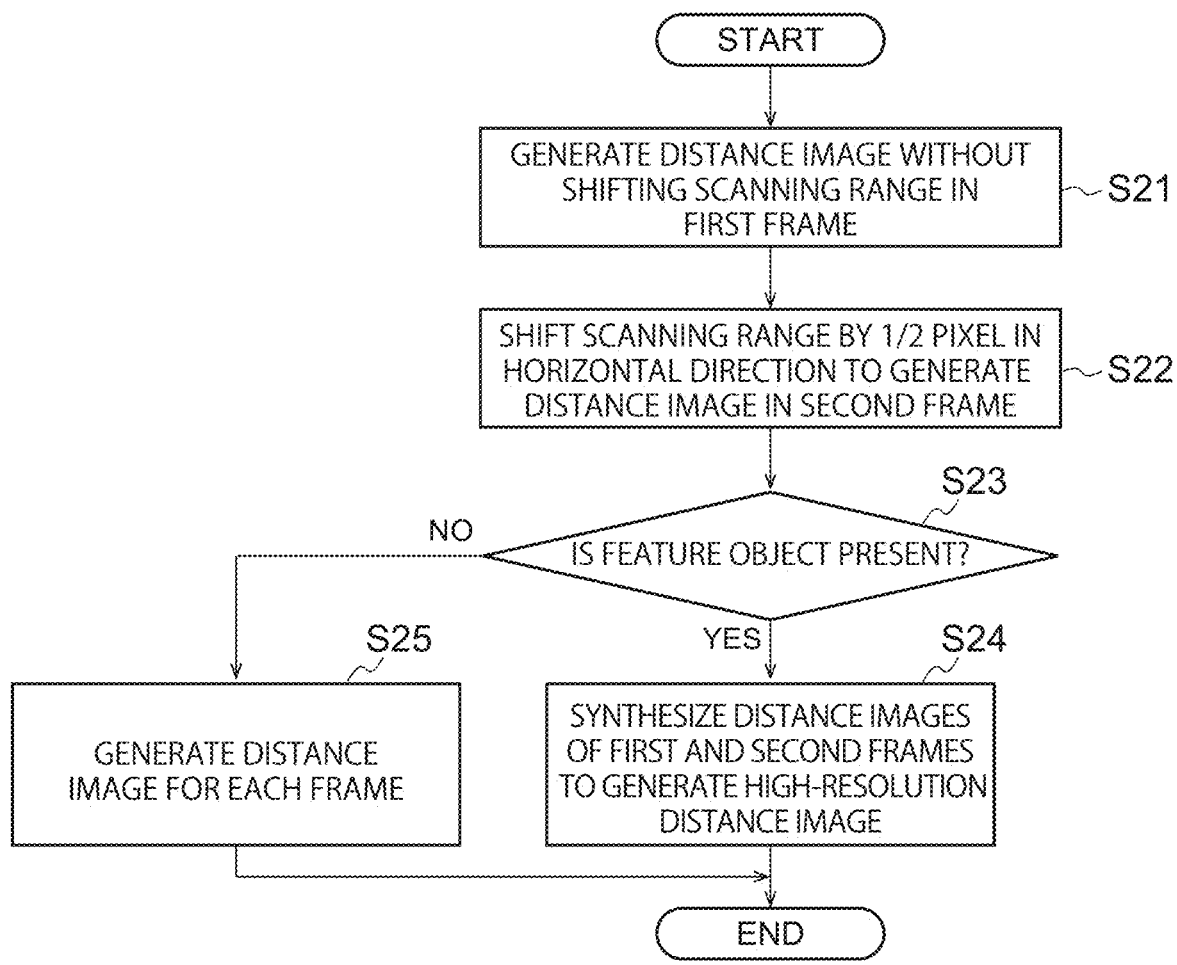
FIG. 25 is a flowchart illustrating a first example of a processing operation of the image processing apparatus and a distance measuring apparatus according to the third embodiment.
Figure 26A:
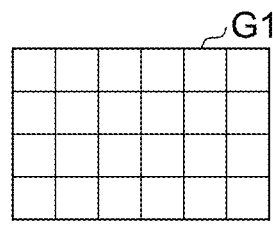
FIG. 26A is a diagram schematically illustrating a distance image generated in step S21 illustrated in FIG. 25.

FIG. 25 is a flowchart illustrating a first example of a processing operation of the image processing apparatus 1 and a distance measuring apparatus 2 according to the third embodiment. First, in the first frame, a distance image is generated by scanning with a light signal in a predetermined reference scanning range (step S21). FIG. 26A is a diagram schematically illustrating the distance image G1 generated in step S21 illustrated in FIG. 25.

Figure 26B:
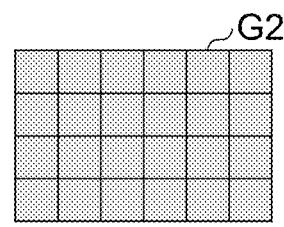
FIG. 26B is a diagram schematically illustrating a distance image generated in step S22 illustrated in FIG. 25.

Next, in the second frame, the scanning range is shifted (delayed) by a ½ pixel in the horizontal direction to generate a distance image G2 (step S22). FIG. 26B is a diagram schematically illustrating the distance image G2 generated in step S22 illustrated in FIG. 25.

Next, the feature object recognizing unit 20 recognizes the feature object and specifies the position of the feature object included in the distance image (step S23). The specified feature object is, for example, a stationary object. Note that the feature object is recognized in each of the distance images G1 and G2. Next, for the feature object, the image synthesizing unit 7 synthesizes feature object images PG of the first and second frames to generate a high-resolution feature object image PG (step S24), In addition, the image synthesizing unit 7 generates a distance image at a normal frame rate without synthesizing images for a region other than the feature object (step S25).

Figure 26C:
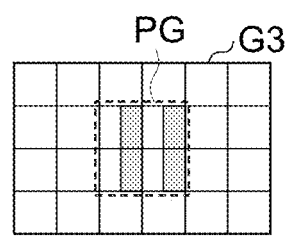
FIG. 26C is a diagram schematically illustrating a distance image of an odd-numbered frame finally generated by processing illustrated in FIG. 25.
Figure 26D:
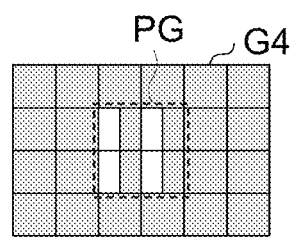
FIG. 26D is a diagram schematically illustrating a distance image of an even-numbered frame.

FIG. 26C is a diagram schematically illustrating a distance image G3 of an odd-numbered frame finally generated by the processing described with reference to FIG. 25, and FIG. 26D is a diagram schematically illustrating a distance image G4 of an even-numbered frame. As illustrated in FIGS. 26C and 26D, only regions of the feature object that are included in the distance images are generated as high-resolution and low-frame-rate feature images PG, and regions other than the regions of the feature object are generated as low-resolution and high-frame-rate range images G3 and G4.

Figure 27:
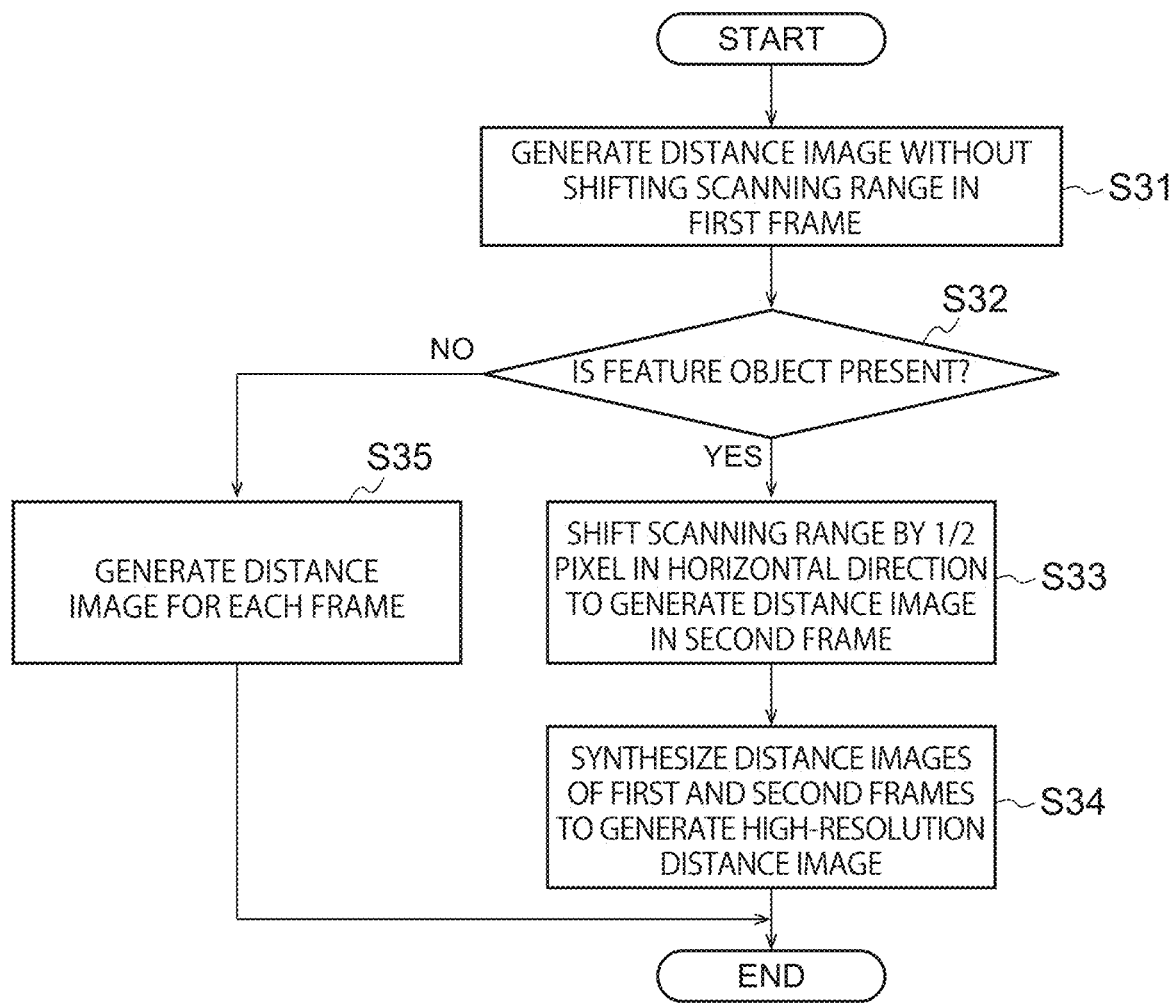
FIG. 27 is a flowchart illustrating a second example of a processing operation of the image processing apparatus and the distance measuring apparatus according to the third embodiment.
Figure 28A:
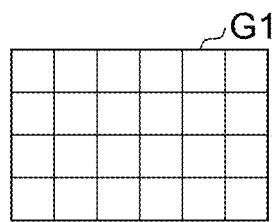
FIG. 28A is a diagram schematically illustrating a distance image generated in step S31 illustrated in FIG. 27.

FIG. 27 is a flowchart illustrating a second example of a processing operation of the image processing apparatus 1 and the distance measuring apparatus 2 according to the third embodiment. First, in the first frame, a distance image is generated by scanning with a light signal in the predetermined reference scanning range (step S31), FIG. 28A is a diagram schematically illustrating the distance image G1 generated in step S31 illustrated in FIG. 27.

Figure 28B:
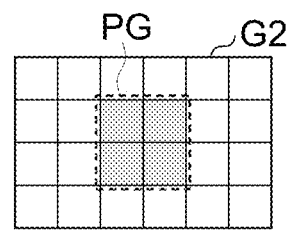
FIG. 28B is a diagram schematically illustrating a feature object image generated in step S33 illustrated in FIG. 27.

Next, the position of the feature object included in the distance image is specified (step S32), The specified feature object is, for example, a stationary object. Next, for the feature object, the light source 3 emits a light signal while the scanning range is shifted (delayed) by a ½ pixel in the second frame, and a reflected light signal from the object 13 is received to generate a feature object image PG (step S33). FIG. 28B is a diagram schematically illustrating the feature object image PG generated in step S33 illustrated in FIG. 27, Next, the feature object image PG of the first frame and the feature object image PG of the second frame are synthesized to generate a high-resolution feature object image PG (step S34).

Figure 28C:
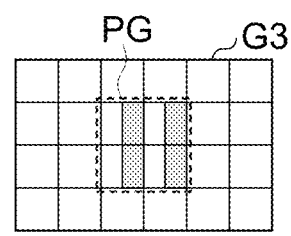
FIG. 28C is a diagram schematically illustrating a distance image of an odd-numbered frame finally generated by processing illustrated in FIG. 27.
Figure 28D:
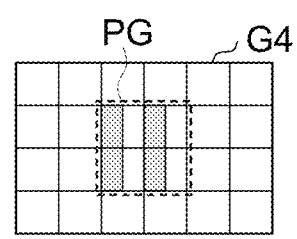
FIG. 28D is a diagram schematically illustrating a distance image of an even-numbered frame.

On the other hand, for a region other than the feature object, the light source 3 emits a light signal in the same scanning range as that in the first frame or at the same scanning timing as that in the first frame for the second frame, a reflected light signal from the object 13 is received, and a distance image is generated for each frame (step S35), FIG. 28C is a diagram schematically illustrating a distance image G3 of an odd-numbered frame finally generated by the processing described with reference to FIG. 27, and FIG. 28D is a diagram schematically illustrating a distance image G4 of an even-numbered frame. As illustrated in these drawings, high-definition and low-frame-rate feature images PG are generated in regions of the feature object, and high-frame-rate distance images G3 and G4 are generated in regions other than the feature object.

Figure 29:
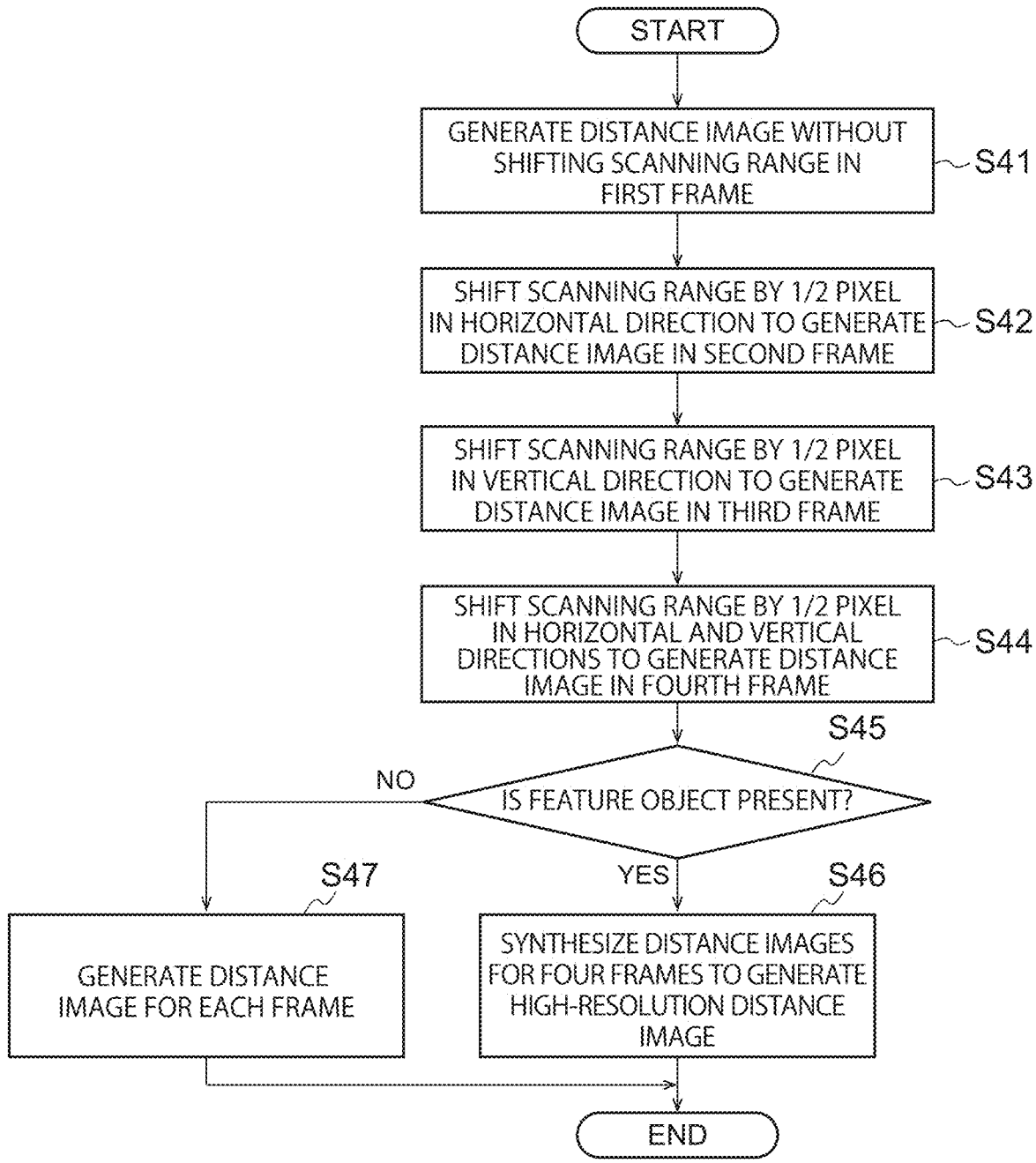
FIG. 29 is a flowchart illustrating a third example of a processing operation of the image processing apparatus and the distance measuring apparatus according to the third embodiment.
Figure 30A:
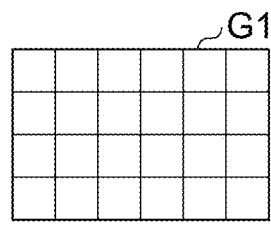
FIG. 30A is a diagram schematically illustrating a distance image generated in step S41 illustrated in FIG. 29.

FIG. 29 is a flowchart illustrating a third example of a processing operation of the image processing apparatus 1 and the distance measuring apparatus 2 according to the third embodiment. First, in the first frame, a distance image is generated by scanning with a light signal in the predetermined reference scanning range (step S41). FIG. 30A is a diagram schematically illustrating the distance image G1 generated in step S41 illustrated in FIG. 29.

Figure 30B:
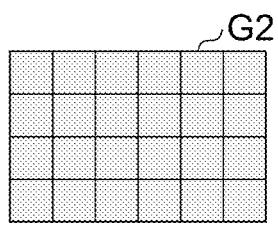
FIG. 30B is a diagram schematically illustrating a distance image generated in step S42 illustrated in FIG. 29.

Next, in the second frame, the scanning range is shifted (delayed) by a ½ pixel in the horizontal direction to generate a distance image G2 (step S42). FIG. 30B is a diagram schematically illustrating the distance image G2 generated in step S42 illustrated in FIG. 29.

Figure 30C:
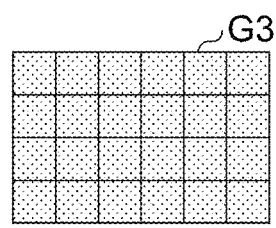
FIG. 30C is a diagram schematically illustrating a distance image generated in step S43 illustrated in FIG. 29.

Next, in the third frame, the scanning range is shifted (delayed) by a ½ pixel in the horizontal direction to generate a distance image G3 (step S43). FIG. 30C is a diagram schematically illustrating the distance image G3 generated in step S43 illustrated in FIG. 29.

Figure 30D:
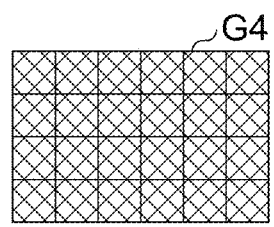
FIG. 30D is a diagram schematically illustrating a distance image generated in step S44 illustrated in FIG. 29.

Next, in the fourth frame, the scanning range is shifted (delayed) by a ½ pixel in the horizontal direction and the vertical direction to generate a distance image G4 (step S44). FIG. 30D is a diagram schematically illustrating the distance image G4 generated in step S44 illustrated in FIG. 29.

Next, the position of the feature object included in the distance image is specified (step S45). For the feature object, the feature object images PG of the first to fourth frames are synthesized to generate a high-resolution feature object image PG. For a region other than the feature object, a distance image G5 is generated for each frame (step S46).

Figure 30E:
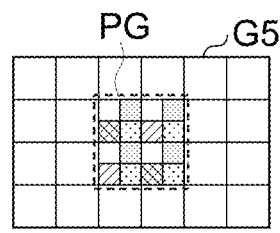
FIG. 30E is a diagram schematically illustrating a distance image finally generated by the image processing apparatus and the distance measuring apparatus in processing illustrated in FIG. 29.

FIG. 30E is a diagram schematically illustrating the distance image G5 finally generated by the image processing apparatus 1 and the distance measuring apparatus 2 in the processing illustrated in FIG. 29. A high-definition and low-frame-rate feature image PG is generated in the region of the feature object, and a high-frame-rate distance image G5 is generated in the region other than the feature object.

FIGS. 31 to 34 are diagrams schematically illustrating a state in which an infrastructure is monitored using the image processing apparatus 1 and the distance measuring apparatus 2 according to the third embodiment. More specifically, FIGS. 31 to 34 illustrate a state of monitoring whether or not a depression 34 has occurred on a road. The image processing apparatus 1 and the distance measuring apparatus 2 cause the scanning unit 4 to perform scanning with a light signal emitted from the light source 3 to generate a distance image. Furthermore, as illustrated in FIG. 27, the feature object may be recognized first, and the scanning range may be shifted by a ½ pixel for each frame only for the feature object.

Figure 31:
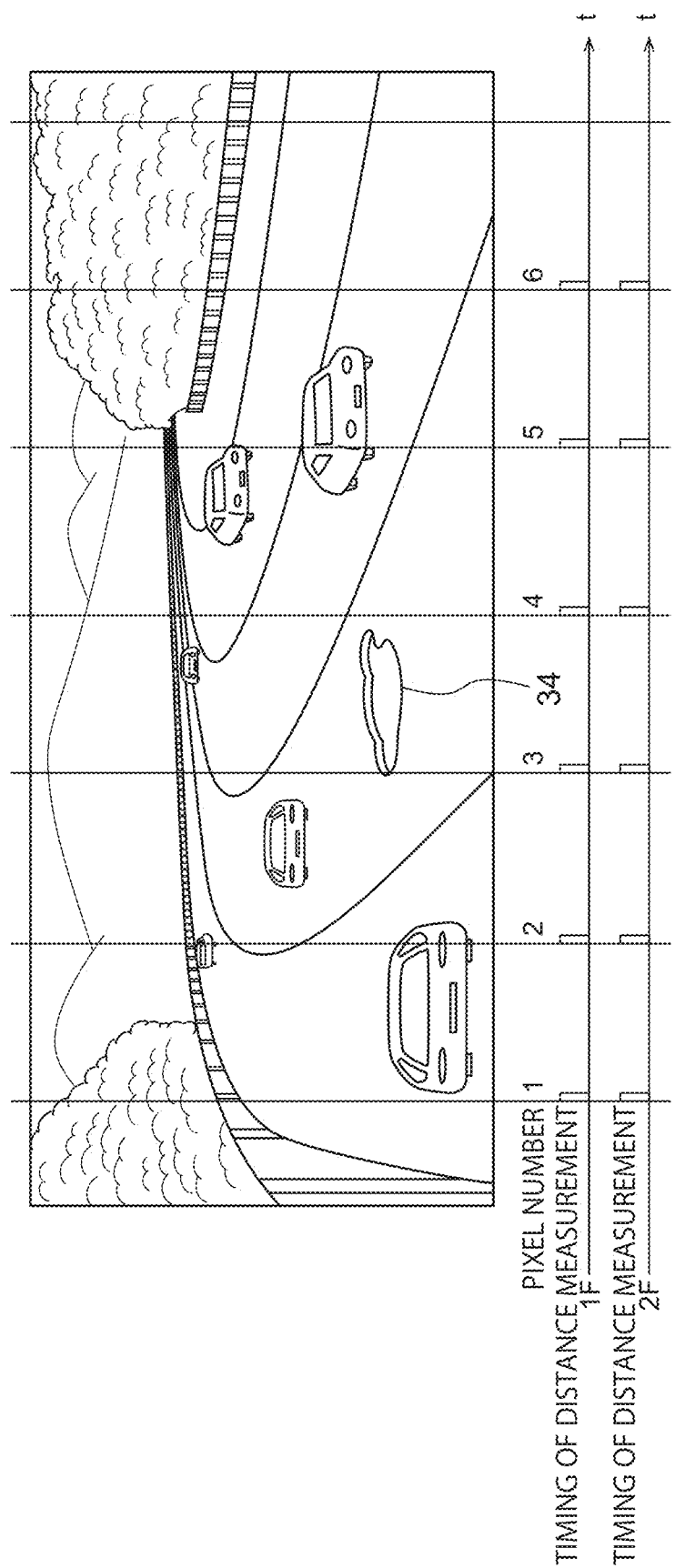
FIG. 31 is a diagram illustrating an example in which a depression has occurred on a road.

FIG. 31 illustrates an example in which the depression 34 has occurred on the road. Before the depression 34 on the road is recognized as a feature object, as illustrated in FIG. 31, the range and timing of scanning with the light signal by the scanning unit 4 are the same in the first and second frames.

Figure 32:
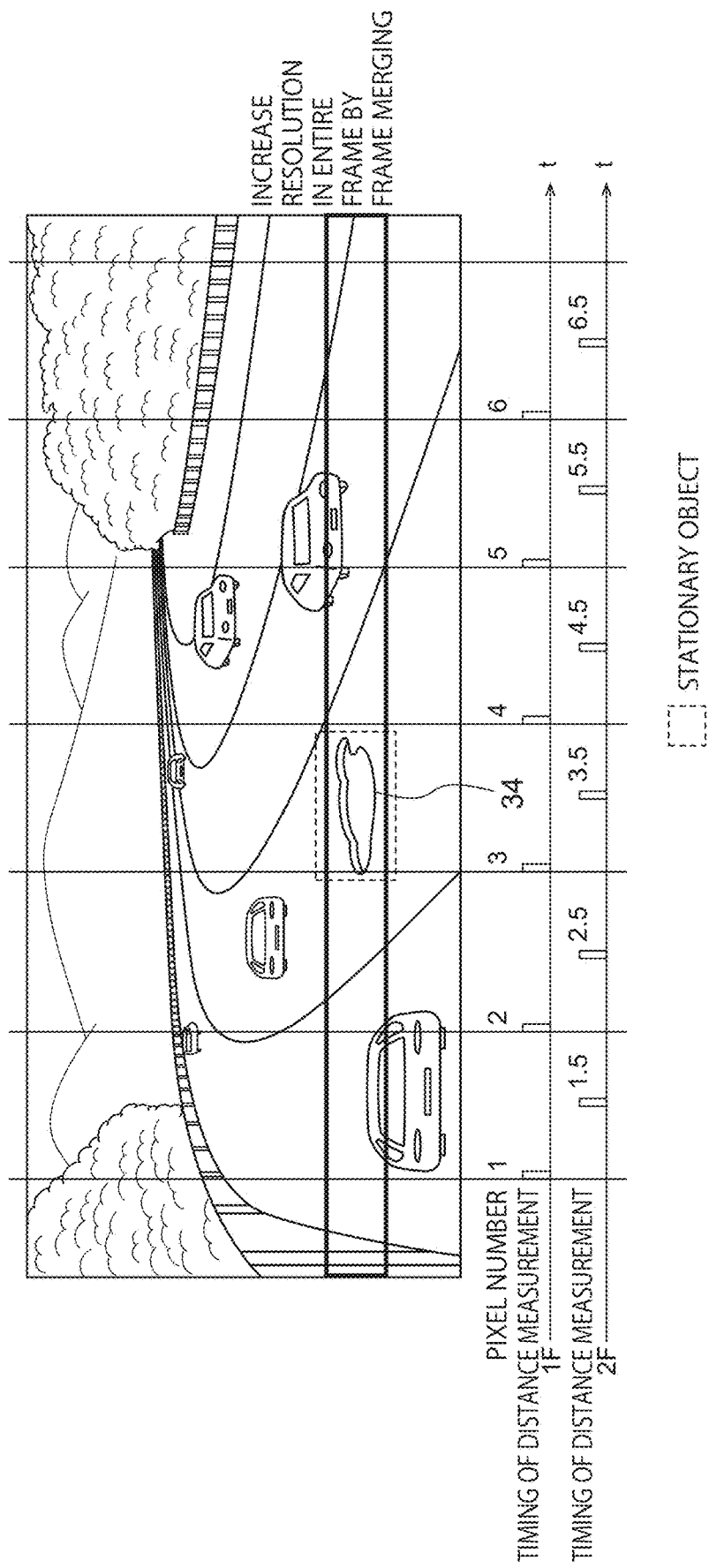
FIG. 32 is a diagram illustrating an example in which the depression on the road is recognized as a feature object and a second frame is scanned with a light signal shifted by a ½ pixel from a first frame.

FIG. 32 illustrates an example in which the depression 34 on the road is recognized as a feature object and a second frame is scanned with a light signal shifted by a ½ pixel from a first frame. The image synthesizing unit 7 synthesizes distance images of the first and second frames to generate a high-resolution distance image. FIG. 32 illustrates an example in which a high-resolution distance image is generated over the entire frame.

In FIG. 33, the depression 34 on the road is recognized as a feature object, a second frame is scanned with a light signal shifted by a ⅓ pixel from a first frame, and a third frame is scanned with a light signal shifted by a ⅔ pixel from the first frame. The image synthesizing unit 7 synthesizes feature object images PG of the first to third frames to generate a feature object image PG having a higher resolution than that of the feature object image illustrated in FIG. 32. FIG. 33 illustrates an example in which a high-resolution distance image is generated over the entire frame.

Figure 34:
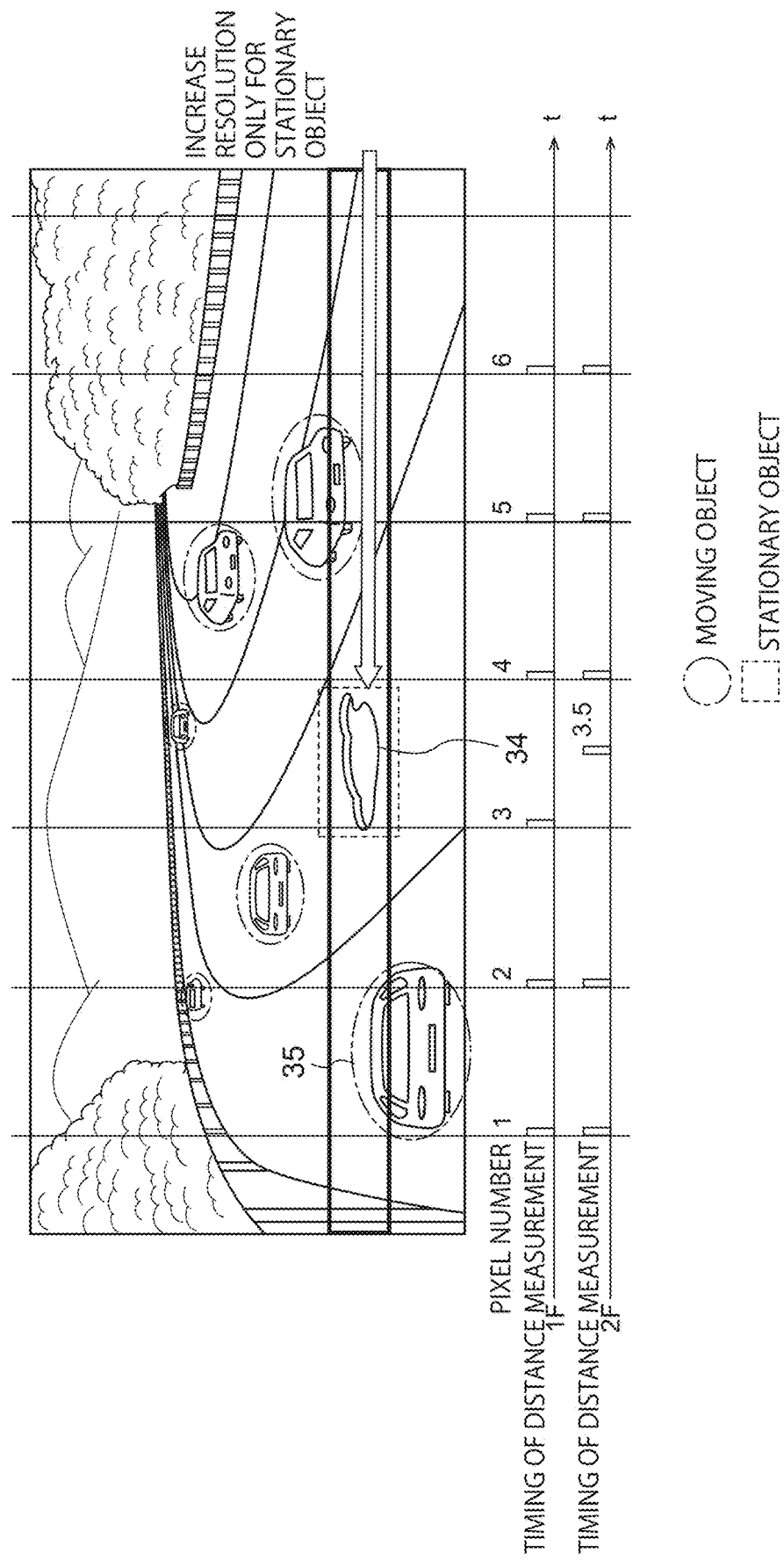
FIG. 34 is a diagram illustrating an example in which the depression on the road is recognized as a feature object, a light signal is emitted while being shifted by a ½ pixel for a region of the depression on the road, a reflected light signal from the depression is received to generate a feature object image, and feature object images of a first frame and a second frame are synthesized to generate a high-resolution feature image.

In FIG. 34, the depression 34 on the road is recognized as a feature object, a light signal is emitted while being shifted by a ½ pixel for a region of the depression 34 on the road, a reflected light signal from the depression 34 is received to generate a feature object image PG, and feature object images PG of a first frame and a second frame are synthesized to generate a high-resolution feature object image PG. On the other hand, since a moving vehicle is present in a region other than the feature object, a distance image is generated at a high frame rate for each frame. The above-described second recognizing unit 24 may recognize the moving object and generate the distance image at the high frame rate.

As described above, the feature object recognizing unit 20 according to the third embodiment can recognize a feature object that is not present before the predetermined period and is stationary by taking a difference between a newly generated distance image and a distance image generated before the predetermined period. Furthermore, the feature object recognizing unit 20 can recognize the moving object 13 by taking a difference between a plurality of distance images generated most recently. The image synthesizing unit 7 can synthesize feature images PG in a plurality of frames to generate a high-resolution feature object image PG for a feature object that is not present before the predetermined period and is stationary. In addition, since a distance image is generated for each frame for a moving object, the moving object can be tracked with high accuracy.

Fourth Embodiment

At least a part of the image processing apparatus 1 and the distance measuring apparatus 2 according to each of the first to third embodiments described above may be configured by hardware or software.

Figure 35:
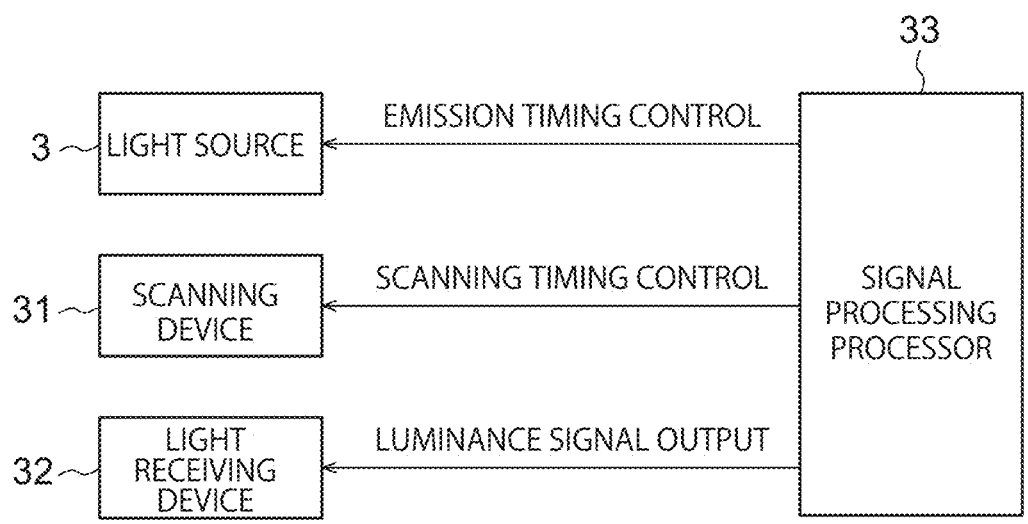
FIG. 35 is a block diagram in a case where the image processing apparatus and the distance measuring apparatus according to each of the first to third embodiments are configured as hardware.

FIG. 35 is a block diagram in a case where the image processing apparatus 1 and the distance measuring apparatus 2 according to each of the first to third embodiments are configured as hardware. Each of the image processing apparatus 1 and the distance measuring apparatus 2 illustrated in FIG. 35 includes a light source 3, a scanning device 31, a light receiving device 32, and a signal processing processor 33.

The light source 3 may be a laser light source or an LED light source. The light source 3 may include a plurality of laser light sources or a plurality of LED light sources.

The scanning device 31 corresponds to the scanning unit 4 according to the first to third embodiments. The scanning device 31 has a function of performing scanning with a light signal in a predetermined scanning range, such as a polygon mirror or a MEMS mirror.

The light receiving device 32 corresponds to the light receiving unit 5 according to the first to third embodiments. The light receiving device 32 may include a plurality of light receiving elements 5a.

The signal processing processor 33 may be a semiconductor chip such as a central processing unit (CPU), a field programmable gate array (FPGA), or a digital signal processor (DSP), or may be a computer device such as a personal computer (PC), a workstation, or a server. The signal processing processor 33 also functions as the scanning control unit 15 and the timing control unit 16 according to the first to third embodiments. Furthermore, the signal processing processor 33 may have the function of the distance measurement unit 10.

Figure 36:
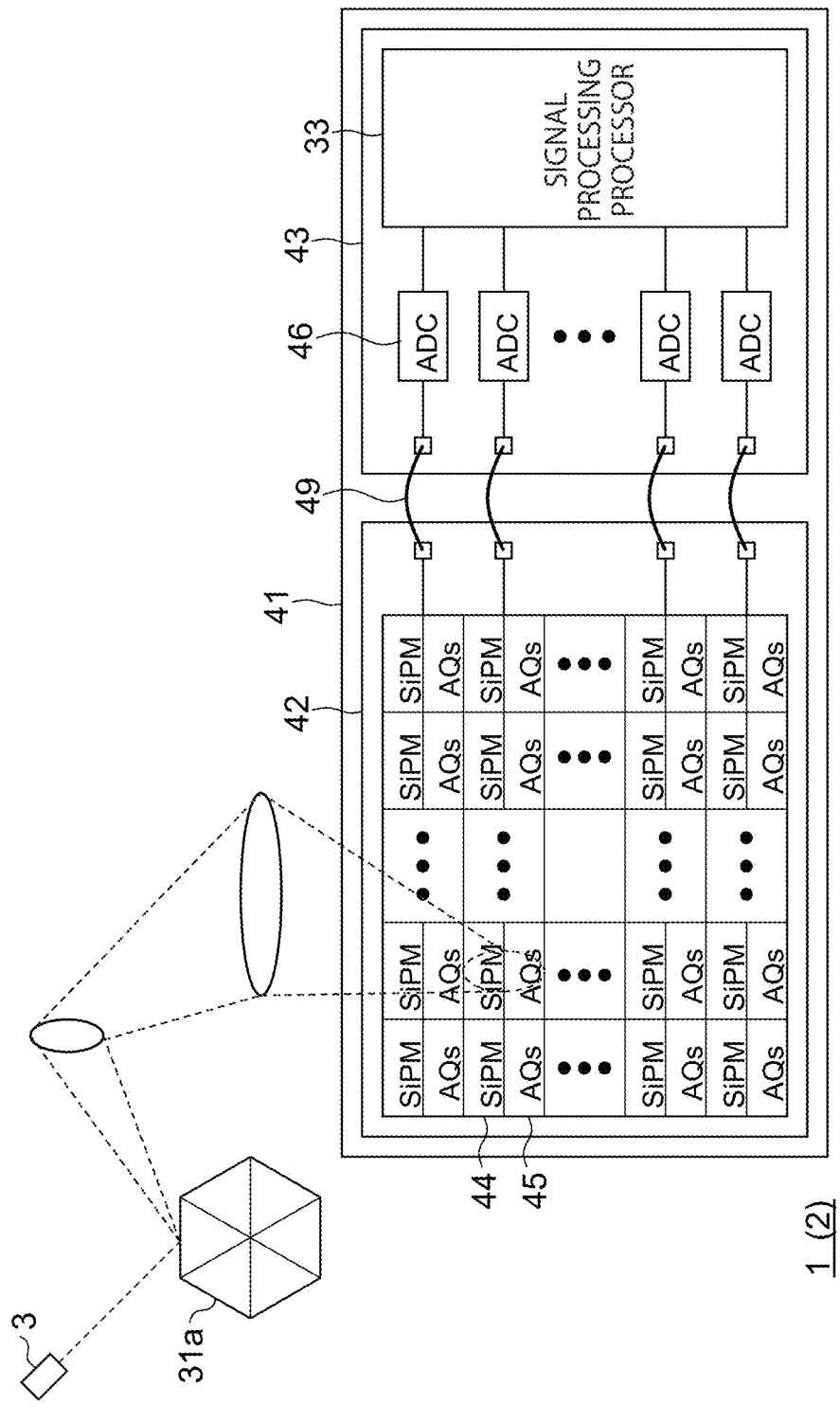
FIG. 36 is a block diagram illustrating a specific hardware configuration of each of the image processing apparatus and the distance measuring apparatus according to each of the first third embodiments.

FIG. 36 is a block diagram illustrating a specific hardware configuration of the image processing apparatus 1 and the distance measuring apparatus 2 according to each of the first to third embodiments. In FIG. 36, a polygon mirror 31a is used as an example of the scanning device 31.

The image processing apparatus 1 and the distance measuring apparatus 2 in FIG. 36 use a silicon in package (SIP) in which the light receiving device 32 and the signal processing processor 33 are incorporated in the same package. In FIG. 36, a first die 42 and a second die 43 are provided on a support substrate 41.

On the first die 42, a plurality of light receiving devices 32 is arranged in a two-dimensional direction. Each light receiving device 32 includes a silicon photomultiplier (SiPM) 44 and an active quenching circuit (AQs) 45, Each SiPM 44 has one or more avalanche photodiodes (APDs). Note that a passive quenching circuit may be provided instead of the active quenching circuit 45.

On the second die 43, a plurality of A/D converters (hereinafter referred to as ADCs) 46 that convert a light signal received by each SiPM 44 into digital pixel data and the signal processing processor 33 are provided. A pad 47 on the first die 42 and a corresponding pad 48 on the second die 43 are connected to each other by a bonding wire 49.

In the image processing apparatus 1 and the distance measuring apparatus 2 illustrated in FIG. 36, since components other than the light source 3 and the scanning device 31 can be constituted by one semiconductor chip, miniaturization and low power consumption can be achieved.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An image processing apparatus comprising:
a light source that emits a light signal at a predetermined time interval;
a scanner capable of changing at least one of a scanning range or a scanning timing of the light signal for each of frames;
a light receiver that receives a reflected light signal reflected on an object by irradiating the object with the light signal; and
processing circuitry,
wherein the processing circuitry is configured to: generate a distance image for each of the frames based on the reflected light signal received by the light receiver; and synthesize the distance images of a plurality of the frames to generate a high-resolution distance image.

2. The image processing apparatus according to claim 1, wherein
the scanner makes at least one of the scanning range or the scanning timing of the light signal different for each of a predetermined number of consecutive frames, and repeatedly and periodically switches the scanning range or the scanning timing of the light signal in units of the predetermined number of frames, the predetermined number being two or more, and
the processing circuitry is configured to synthesize distance images of the predetermined number of frames to generate the high-resolution distance image.

3. The image processing apparatus according to claim 1, wherein
the scanner changes a scanning angle of the light signal emitted from the light source for each of the frames.

4. The image processing apparatus according to claim 1, wherein the processing circuitry is further configured to switch and control a light emission direction of the scanner for each of the frames.

5. The image processing apparatus according to claim 1, wherein the processing circuitry is further configured to:
switch and control a light emission direction of a housing unit in which the light source is built for each of the frames, and
switch and control the light emission direction of the housing unit to cause the scanner to change the range of the scanning with the light signal for each of the frames.

6. The image processing apparatus according to claim 1, wherein the processing circuitry is further configured to variably control a speed at which the scanner switches a traveling direction of the light signal for each of the frames.

7. The image processing apparatus according to claim 1, wherein the processing circuitry is further configured to control an emission start timing at which the light source starts emitting the light signal, wherein the scanner switches the scanning timing of the light signal for each of the frames based on the emission start timing at which the light source starts emitting the light signal.

8. The image processing apparatus according to claim 7, wherein
the processing circuitry is configured to variably control the emission start timing of the light signal for each of the frames without changing an emission interval at which the light source emits the light signal.

9. The image processing apparatus according to claim 8, wherein
the light source emits a plurality of light signals at the same emission interval starting from different emission start times for each of consecutive n frames, n being an integer of 2 or more, and
the processing circuitry is configured to synthesize distance images generated in each of the n frames.

10. The image processing apparatus according to claim 1, wherein the processing circuitry is further configured to perform processing of eliminating a blur in the generated high-resolution distance image.

11. The image processing apparatus according to claim 10, wherein
the processing circuitry is further configured to:
perform deconvolution processing on luminance information of the high-resolution distance image generated by using a light intensity distribution of the light signal emitted from the light source to generate reflectance of the object; and
sharpen an edge of the generated high-resolution distance image based on the generated reflectance of the object.

12. The image processing apparatus according to claim 11, wherein
the processing circuitry is configured to set a threshold for a luminance signal corresponding to the reflected light signal received by the light receiver based on the reflectance of the generated object, binarizes the luminance signal based on the threshold, and corrects the high-resolution distance image generated based on a binarized luminance value.

13. The image processing apparatus according to claim 11, wherein
the processing circuitry is configured to estimate a luminance value corresponding to the reflected light signal received by the light receiver based on the generated reflectance of the object, and corrects the high-resolution distance image generated based on the luminance value.

14. The image processing apparatus according to claim 1, wherein the processing circuitry is further configured to recognize a feature object included in the generated distance image, wherein
the processing circuitry is configured to output the high-resolution distance image generated at a first frame rate for the feature object, and outputs the distance image at a second frame rate higher than the first frame rate without changing a resolution for a region other than the feature object.

15. The image processing apparatus according to claim 14, wherein
the feature object is a stationary object satisfying a predetermined condition.

16. The image processing apparatus according to claim 15, wherein
the processing circuitry is further configured to recognize the feature object that is not present before a predetermined period and is stationary based on a difference between the generated distance image and a distance image generated before the predetermined period.

17. The image processing apparatus according to claim 16, wherein
the processing circuitry is configured to recognize the moving object based on a difference between a plurality of distance images generated most recently.

18. The image processing apparatus according to claim 17, wherein
the processing circuitry is configured to output the high-resolution distance image generated at the first frame rate in a partial region including the feature object and outputs the distance image generated at the second frame rate in a partial region including the moving object based on results of the recognition.

19. A distance measuring apparatus comprising:
an image processing apparatus; and
a processing circuitry, wherein
the image processing apparatus comprises:
a light source that emits a light signal at a predetermined time interval;
a scanner capable of changing at least one of a scanning range or a scanning timing of the light signal for each of frames; and
a light receiver that receives a reflected light signal reflected on an object by irradiating the object with the light signal,
wherein the processing circuitry is configured to:
generate a distance image for each of the frames based on the reflected light signal received by the light receiver;
synthesize the distance images of the plurality of frames to generate a high-resolution distance image; and
measure a distance to the object based on a time when the reflected light signal is received by the light receiver and a time when the light signal is emitted from the light source.

20. An image processing method comprising:
changing at least one of a scanning range or a scanning timing of the light signal for each of frames;
receiving a reflected light signal reflected on an object by irradiating the object with the light signal;
generating a distance image for each of the frames based on the received reflected light signal; and
synthesizing the distance images of a plurality of frames to generate a high-resolution distance image.

* * * * *